US006531692B1

(12) United States Patent
Adan et al.

(10) Patent No.: US 6,531,692 B1
(45) Date of Patent: Mar. 11, 2003

(54) OPTICAL COUPLING ASSEMBLY FOR IMAGE SENSING OPERATOR INPUT DEVICE

(75) Inventors: Manolito E. Adan, Woodinville, WA (US); Mark W. Casebolt, Seattle, WA (US); Erik G. von Fuchs, Duvall, WA (US); Suresh Venkat, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/273,899

(22) Filed: Mar. 22, 1999

(51) Int. Cl.[7] .............................. H01J 40/14; G02B 6/06; G09G 5/00
(52) U.S. Cl. .................. 250/221; 250/551; 250/227.24; 345/157
(58) Field of Search ........................... 250/221, 222.1, 250/208.1, 551, 227.11, 227.24; 345/156, 157, 163, 164, 165, 166

(56) References Cited

U.S. PATENT DOCUMENTS

| 4,364,035 A | 12/1982 | Kirsch | 340/710 |
|---|---|---|---|
| 4,390,873 A | 6/1983 | Kirsch | 340/710 |
| D281,776 S | 12/1985 | Griffin | D21/48 |
| 4,578,674 A | 3/1986 | Baker et al. | 340/710 |
| 4,647,771 A | 3/1987 | Kato | 250/237 R |
| 4,682,159 A | 7/1987 | Davison | 340/709 |
| 4,712,101 A | 12/1987 | Culver | 340/710 |
| 4,736,191 A | 4/1988 | Matzke et al. | 340/365 |
| 4,751,505 A | 6/1988 | Williams et al. | 340/710 |
| 4,786,763 A | 11/1988 | Langewis et al. | 200/6 |
| 4,799,055 A | 1/1989 | Nestler et al. | 340/710 |
| 4,804,949 A | 2/1989 | Faulkerson | 340/710 |
| D302,010 S | 7/1989 | McLaughlin et al. | D14/114 |
| 4,856,785 A | 8/1989 | Lantz et al. | 273/148 |
| 4,857,903 A | 8/1989 | Zalenski | 340/710 |
| 4,906,843 A | 3/1990 | Jones et al. | 250/221 |
| 4,922,236 A | 5/1990 | Heady | 340/710 |
| 4,949,080 A | 8/1990 | Mikan | 340/711 |
| D315,896 S | 4/1991 | Brown | D14/100 |
| 5,045,843 A | 9/1991 | Hansen | 340/709 |
| 5,142,506 A | 8/1992 | Edwards | 367/127 |
| 5,274,361 A | 12/1993 | Snow | 345/166 |
| 5,296,838 A | 3/1994 | Suzuki | 345/157 |
| 5,347,275 A | 9/1994 | Lau | 341/20 |

(List continued on next page.)

FOREIGN PATENT DOCUMENTS

| EP | 0 403 782 | 12/1990 |
|---|---|---|
| EP | 0 609 819 A1 | 8/1994 |
| GB | 2 272 763 A | 11/1993 |
| WO | WO/94/10652 | 5/1993 |
| WO | WO/97/29477 | 2/1997 |

Primary Examiner—Kevin Pyo
(74) Attorney, Agent, or Firm—Joseph R. Kelly; Westman, Champlin & Kelly, P.A.

(57) ABSTRACT

An emitter lens is provided between the radiation source and the work surface to be illuminated. The emitter lens collects radiation and reshapes the illumination pattern to increase intensity and uniformity. The radiation source and emitter lens have associated housings which act to properly orient and align the emitter lens and radiation source. The emitter lens also acts to space the radiation source from an aperture in a housing of the computer input device to provide protection against damage due to electrostatic discharge (ESD). An imaging lens is provided between the work surface and the image sensor to focus light reflected from the work surface onto the image sensor. An imaging lens housing or holder is provided to properly orient and align the imaging lens with the image sensor. The imaging lens housing provides an apron which increases ESD discharge path length. The imaging lens housing also provides bias members and a lens/sensor interface which act to accurately locate the imaging lens closely proximate the image sensor.

47 Claims, 12 Drawing Sheets

U.S. PATENT DOCUMENTS

| | | | |
|---|---|---|---|
| 5,349,371 A | 9/1994 | Fong | 345/166 |
| 5,367,315 A | 11/1994 | Pan | 345/156 |
| 5,440,144 A | 8/1995 | Raffel et al. | 250/574 |
| 5,463,387 A | 10/1995 | Kato | 341/31 |
| 5,471,542 A | 11/1995 | Ragland | 382/128 |
| 5,517,211 A | 5/1996 | Kwang-Chien | 345/166 |
| 5,525,764 A | 6/1996 | Junkins et al. | 178/18 |
| 5,532,476 A | 7/1996 | Mikan | 250/221 |
| 5,557,440 A | 9/1996 | Hanson et al. | 359/161 |
| 5,558,329 A | 9/1996 | Liu | 273/148 B |
| 5,561,445 A | 10/1996 | Miwa et al. | 345/163 |
| 5,574,480 A | 11/1996 | Pranger et al. | 345/166 |
| 5,577,848 A | 11/1996 | Bowen | 400/472 |
| 5,617,312 A | 4/1997 | Iura et al. | 364/188 |
| 5,627,565 A | 5/1997 | Morishita et al. | 345/158 |
| 5,644,337 A | 7/1997 | Stacy | 345/167 |
| 5,680,157 A | 10/1997 | Bidiville et al. | 345/165 |
| 5,686,942 A | 11/1997 | Ball | 345/158 |
| 5,689,284 A | 11/1997 | Herget | 345/145 |
| 5,694,153 A | 12/1997 | Aoyagi et al. | 345/161 |
| 5,729,009 A | 3/1998 | Dandliker et al. | 250/208.2 |

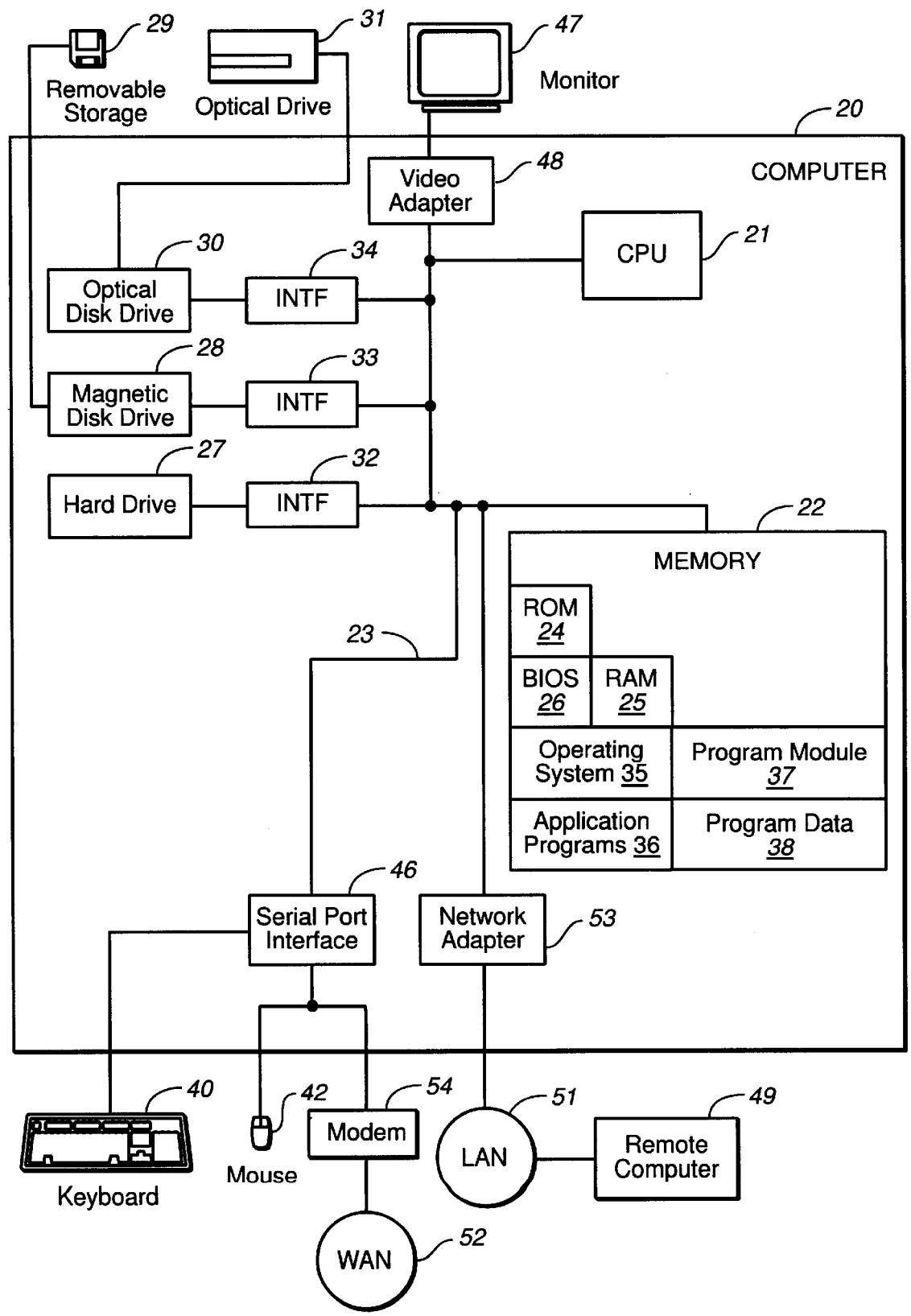
FIG._1

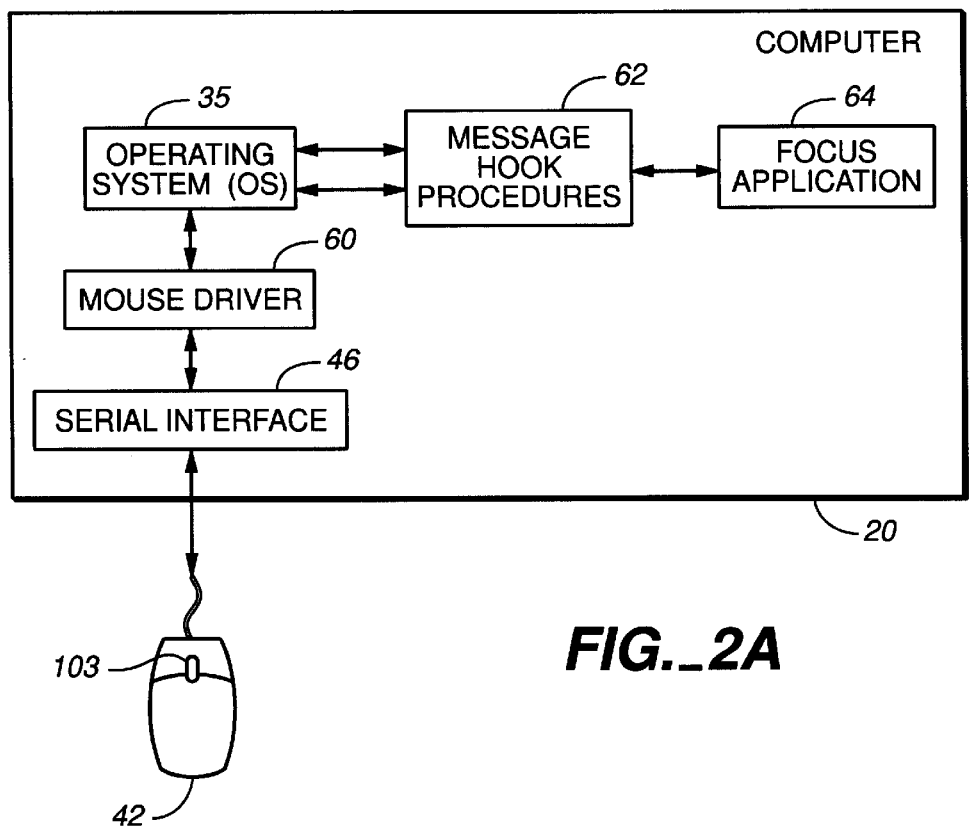
FIG._2A
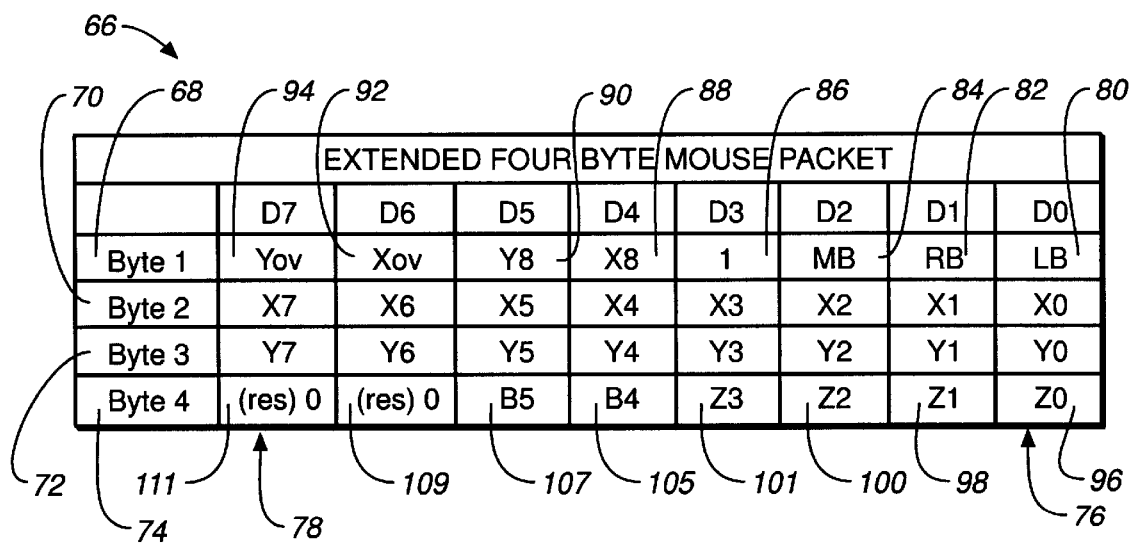
FIG._2B

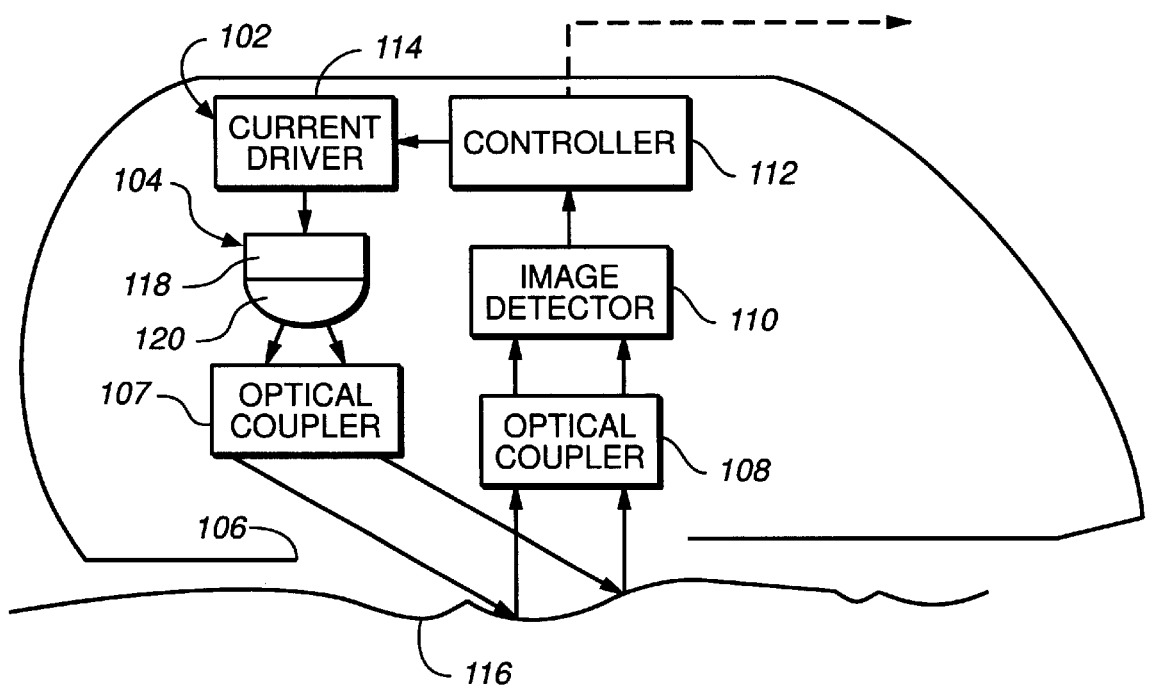
FIG._3
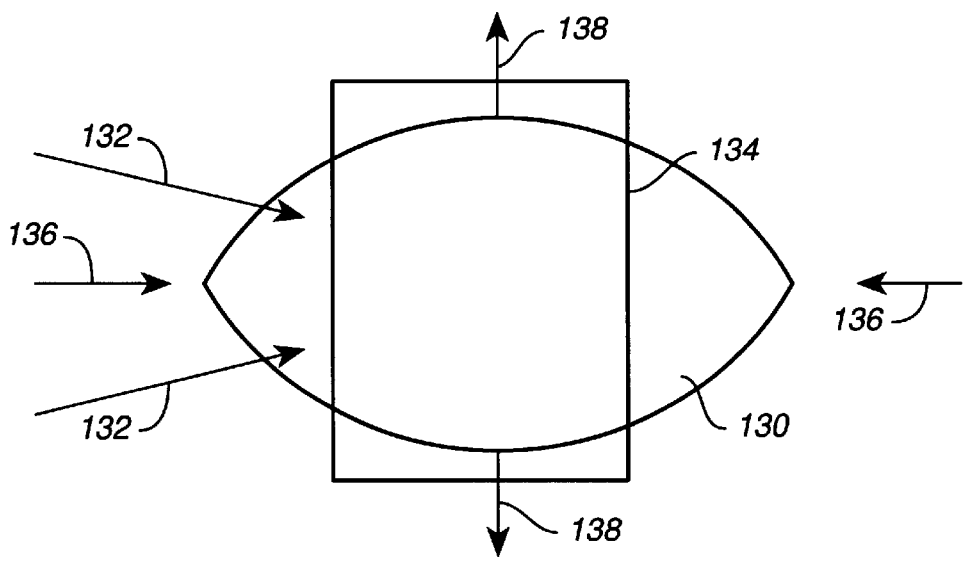
FIG._4A

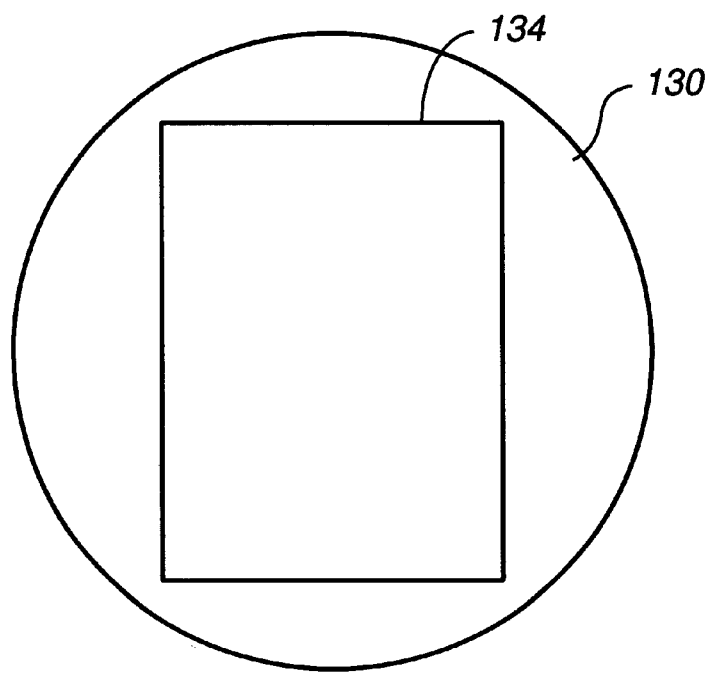
FIG._4B
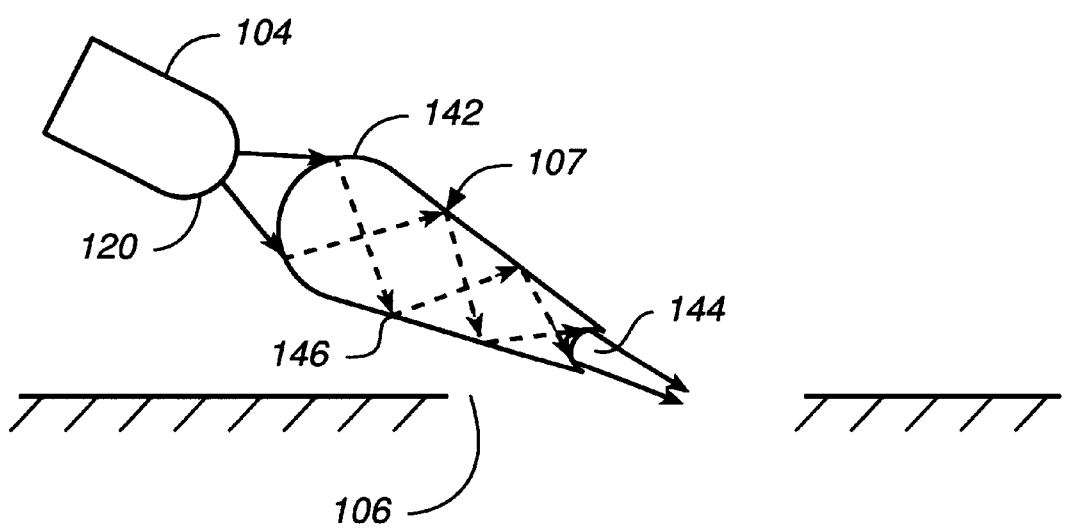
FIG._5

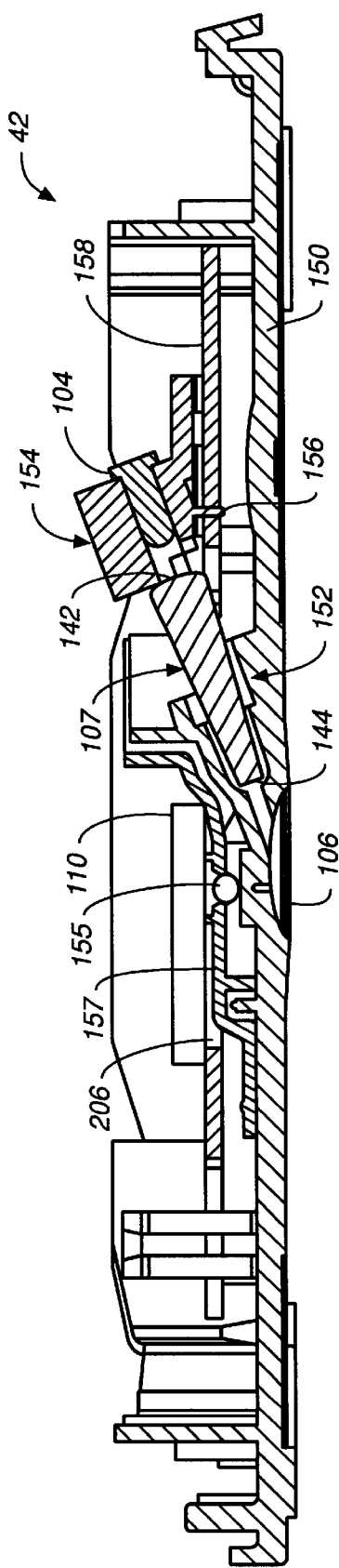
FIG._6
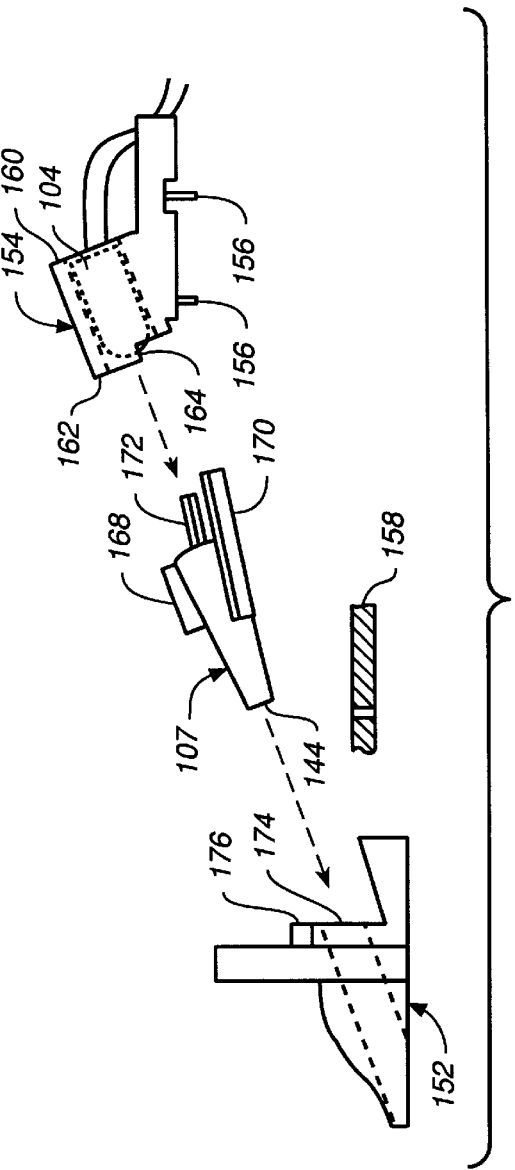
FIG._7C
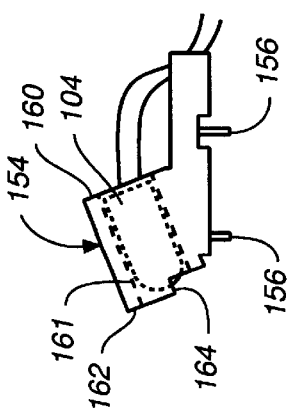
FIG._7A
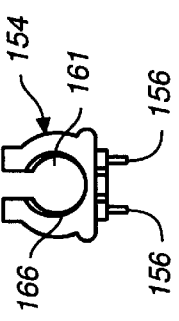
FIG._7B

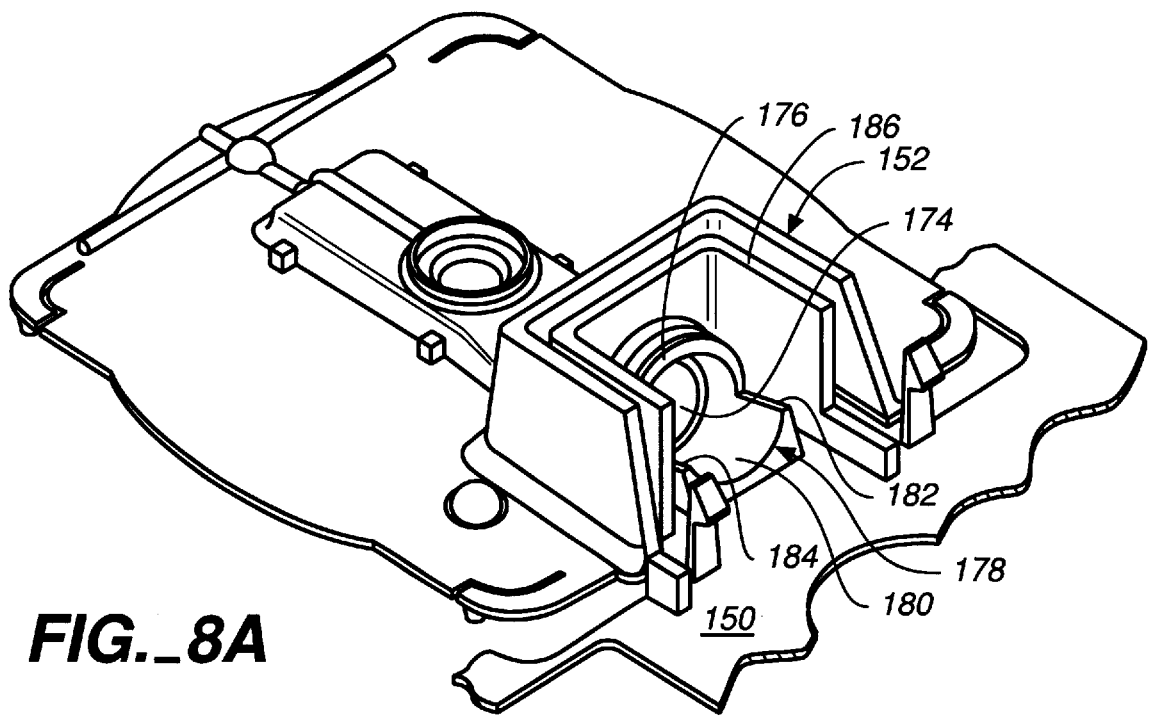
FIG._8A
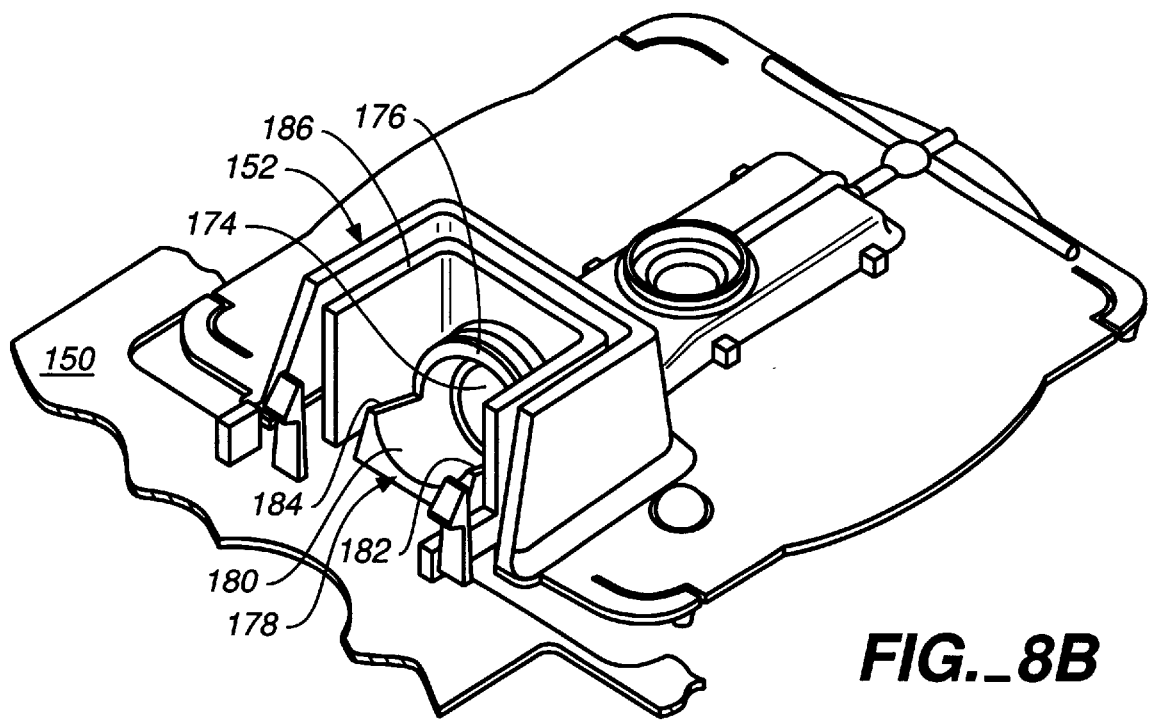
FIG._8B

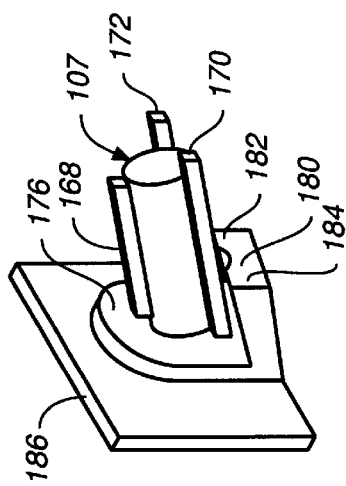
FIG._9
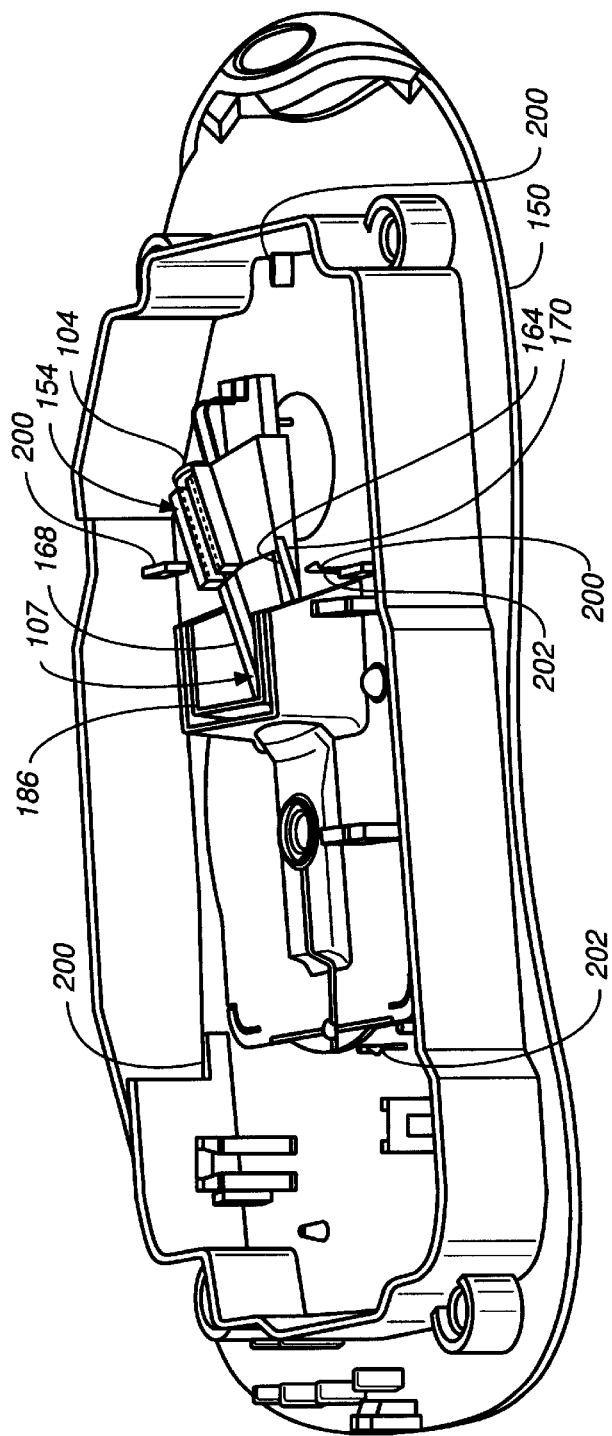
FIG._10A

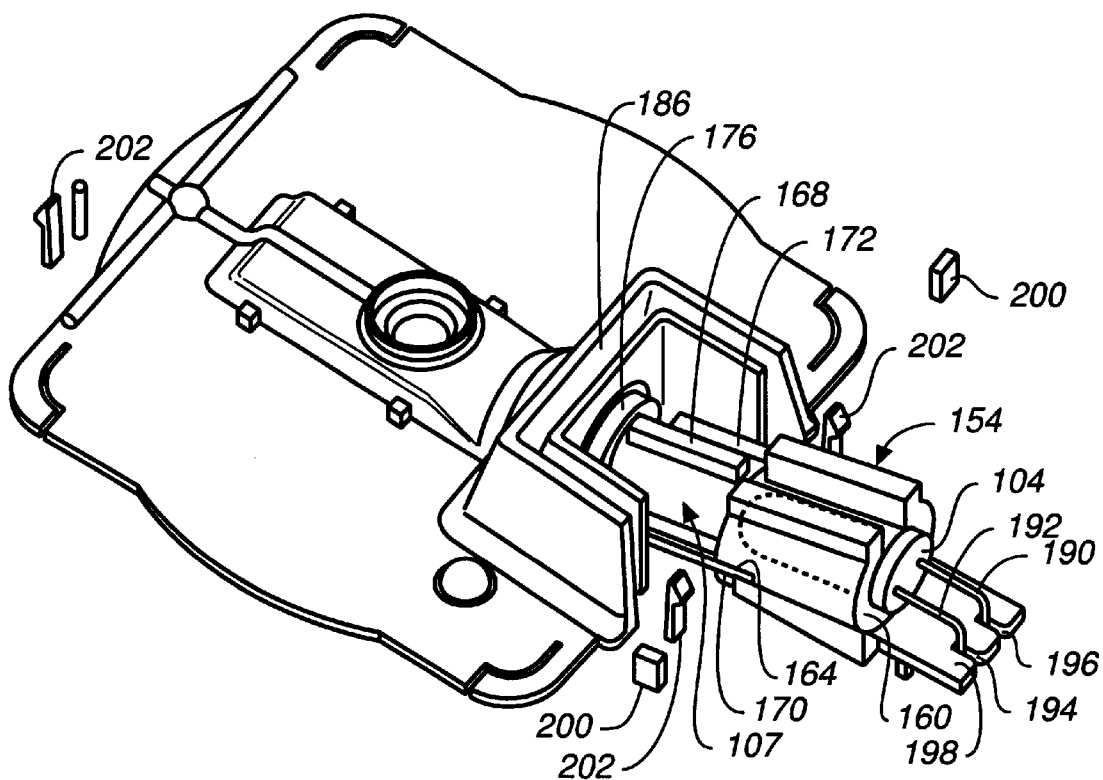
FIG._10B

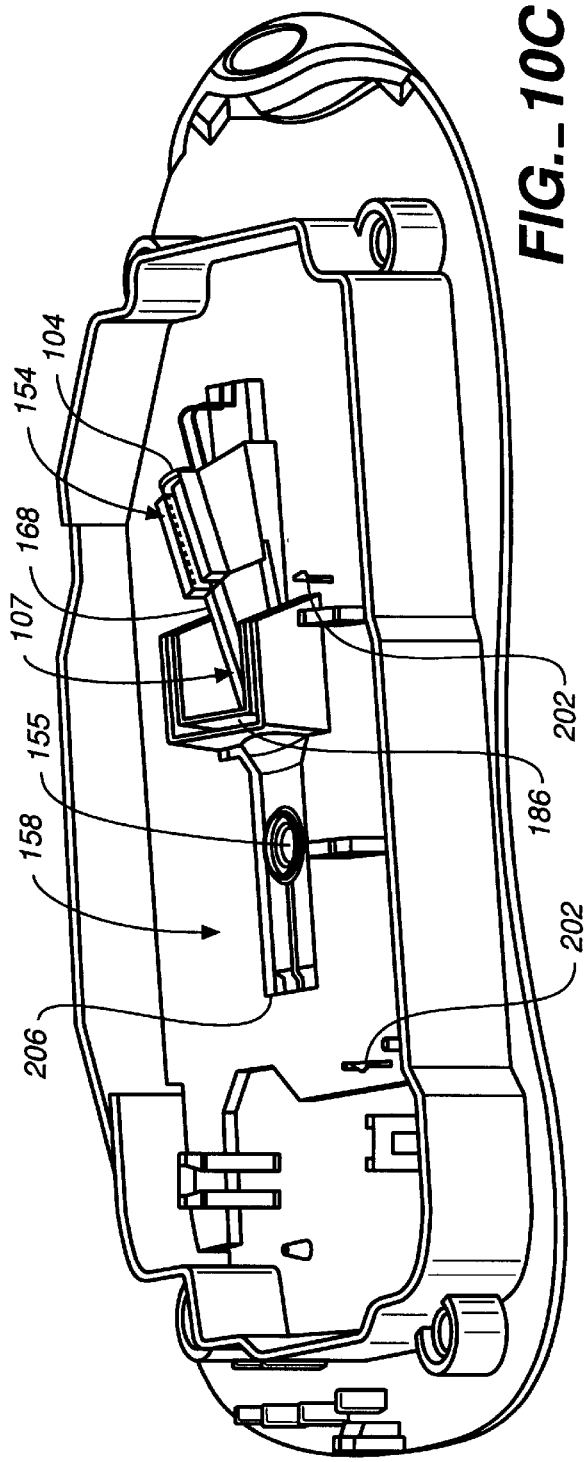
FIG._10C
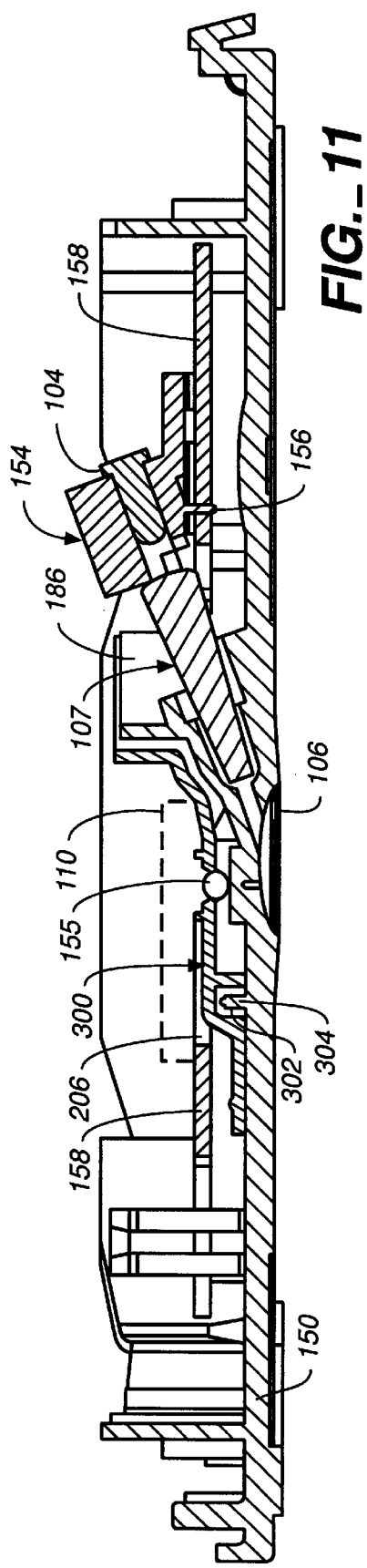
FIG._11

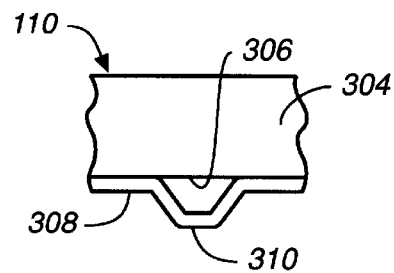
FIG._12
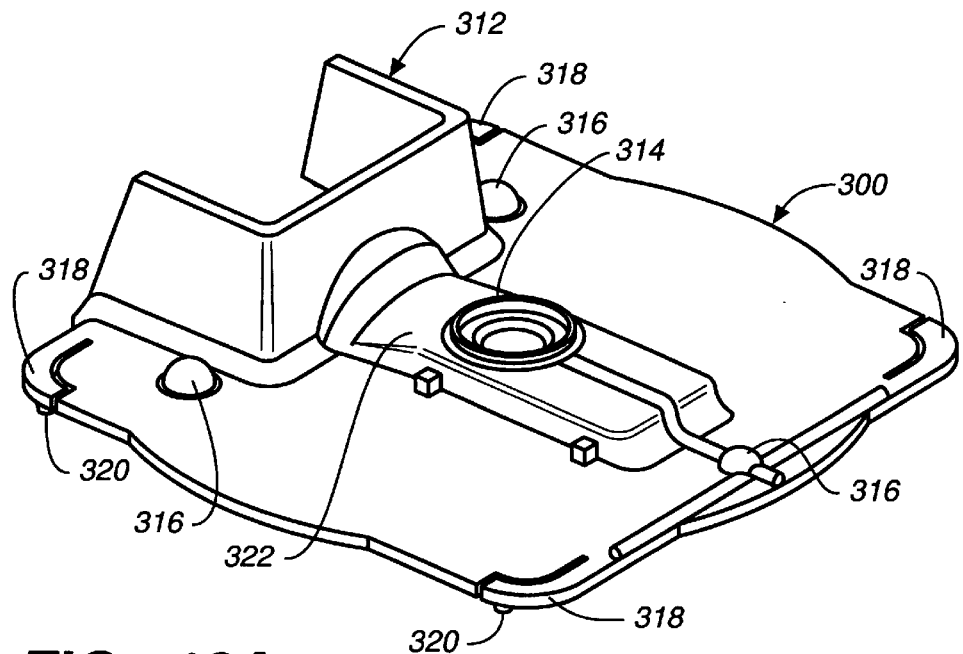
FIG._13A
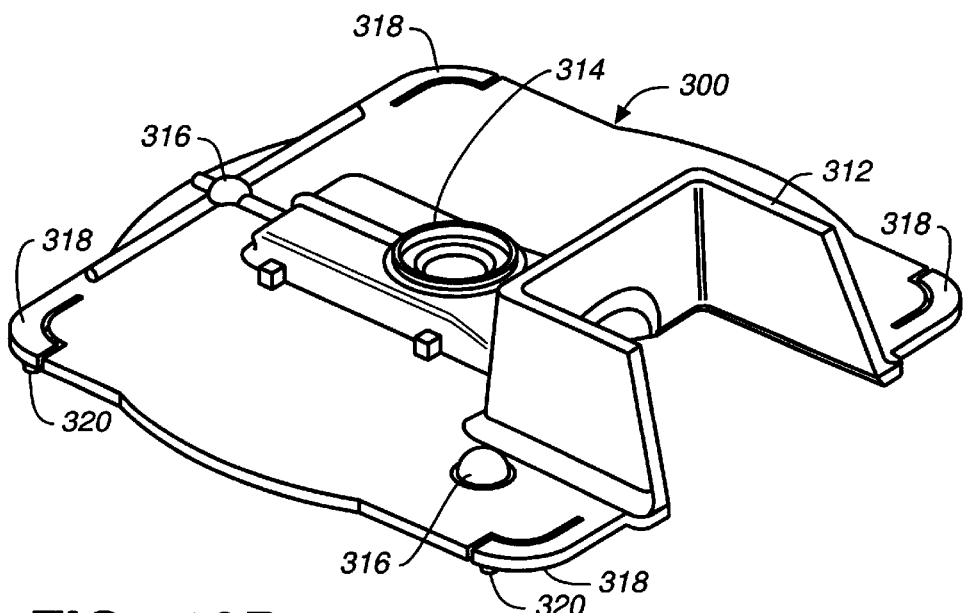
FIG._13B

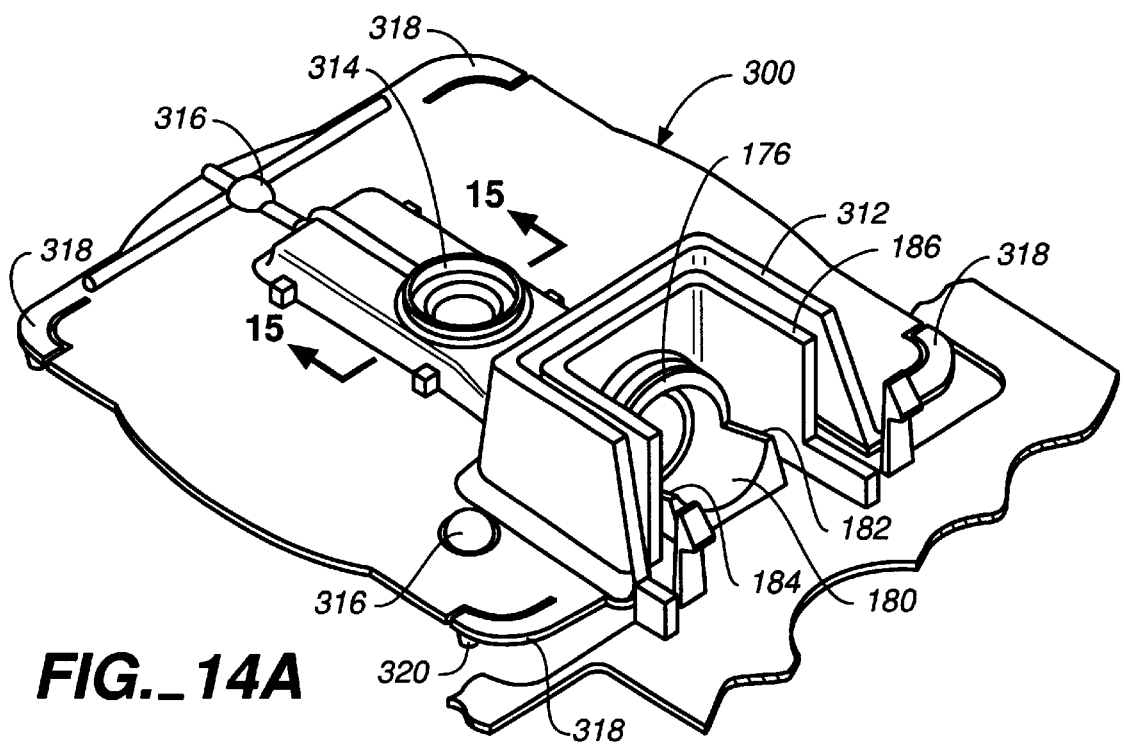
FIG._14A
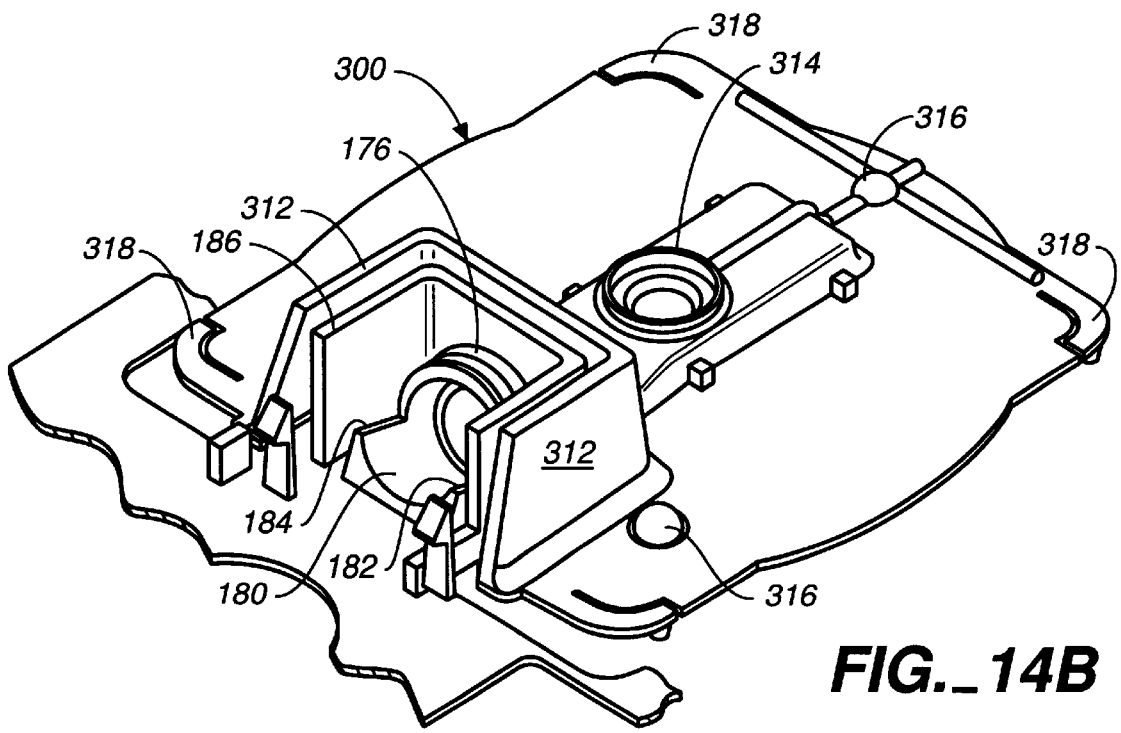
FIG._14B

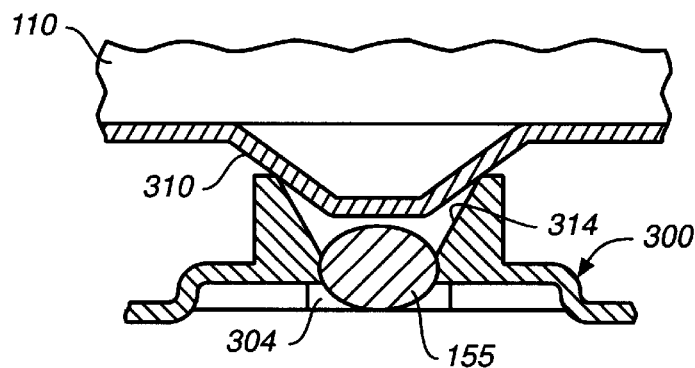
FIG._15
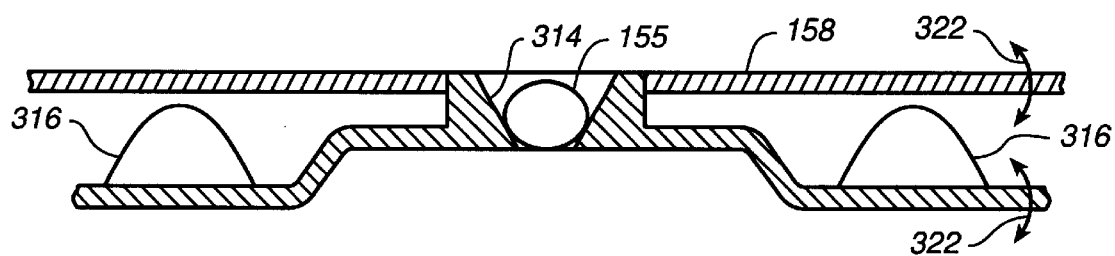
FIG._16
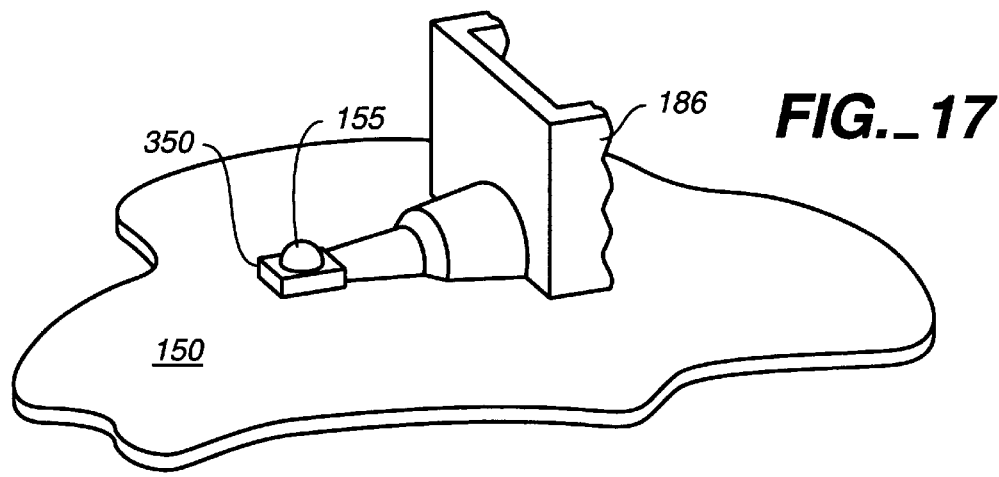
FIG._17
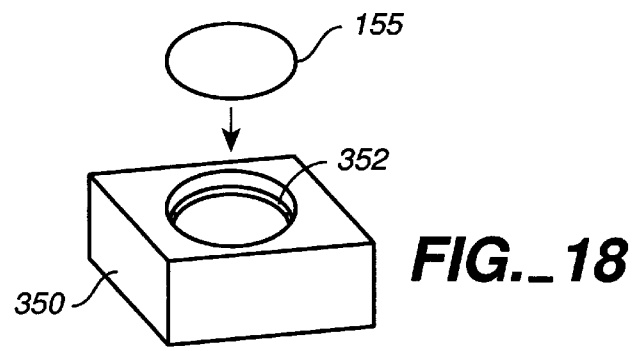
FIG._18

OPTICAL COUPLING ASSEMBLY FOR IMAGE SENSING OPERATOR INPUT DEVICE

REFERENCE TO CO-PENDING APPLICATION

Reference is made to U.S. patent application Ser. No. 09/036,809, filed Mar. 9, 1998, entitled "OPERATOR INPUT DEVICE", now U.S. Pat. No. 6,172,354, issue Jan. 9, 2001 and Ser. No. 09/217,403, filed Dec. 21, 1998, entitled "IMAGE SENSING OPERATOR INPUT DEVICE" now U.S. Pat. No. 6,303,924, issue Oct. 16, 2001 both of which are assigned to the same assignee as the present application. Both applications are hereby fully incorporated by reference.

INCORPORATION BY REFERENCE

The following U.S. patent is hereby fully incorporated by reference:

U.S. Pat. No. 5,581,094 issued to Hara et al., entitled "PHOTODETECTOR ARRAY COMPRISING PHOTO DETECTORS, AND OBJECT DETECTOR COMPRISING THE PHOTO DETECTOR ARRAY AND AN OBJECT DETECTING PROCEDURE", and assigned to Mitsubishi Electric Corporation.

BACKGROUND OF THE INVENTION

The present invention relates to an input device for a computer system. More specifically, the present invention relates to an optical coupling assembly for an input device which provides position information to the computer system based on movement of the input device.

A traditional computer input device, such as a mouse, includes a housing with a ball mounted in the housing. The ball is either configured in a traditional manner in which, in the normal work position, the ball engages a work surface and rotates in response to the user's movement of the mouse across the work surface. The ball may also be provided as a track ball, which is rotated by digital manipulation from the user. In either case, position encoders are used to detect rotation of the ball in the mouse, and to provide position information indicative of that rotation to the computer. In many instances, the position information is used to control movement of a visual image (such as a mouse cursor) on the display screen of the computer.

Also, in one prior device, a computer input device is configured with the track ball arrangement described above. The track ball is preprinted with a uniform predetermined or predefined image. A charge coupled device is used to detect the image on the track ball and detect movement of the image. Movement of the predefined image is used to provide position information to the computer.

However, the prior computer mouse which uses the charge coupled device configuration has a number of significant disadvantages. First, the reaction time of charge coupled devices is quite slow. In addition, processing an image signal from a charge coupled device is computationally intensive and takes a relatively large, and expensive processor. Also, charge coupled devices are highly sensitive to saturation. In other words, if the ambient light conditions are variable, charge coupled devices do not perform well. In addition, if an extraneous light source, such as a relatively bright light, is directed toward the image producing surface, the charge coupled devices can easily become saturated and their performance then quickly degrades.

Further, another prior computer mouse commercially available from Mouse Systems of California included a mouse with an LED which was used in conjunction with a mouse pad having a predetermined, uniform pattern thereon. The pattern was formed by a uniform grid of blue and red lines. The emissions from the LED was reflected off of the: mouse pad to a detector which provided an analog output signal. The signal was in the ,form of a waveshape with peaks corresponding to the different colored grid lines. From this waveform, the lines were counted and interpolated to obtain position information. Such a mouse system requires a mouse pad with a special uniform pattern implemented-thereon.

In the two co-pending patent applications referenced above, an image sensor (such as an imaging array) is used in one illustrative embodiment to detect movement of the computer input device over a work surface. The imaging array can be thought of as taking a picture of the work surface, and analyzing the picture for a pattern or for surface texture or color markings. After waiting an appropriate time, the array takes another picture of the surface and compares it with the previous picture. By finding areas of the two pictures which are the same (or similar), a direction, distance, and/or rotation vector can be determined.

In order for the image sensor to take the picture, a radiation source is used to impinge electromagnetic radiation on the work surface. Radiation reflected from the work surface is reflected back towards the image sensor which captures the image (or takes the picture).

SUMMARY OF THE INVENTION

It has been found that many commercially available radiation sources, and in particular light emitting diodes (LEDs), suffer from common problems. The LEDs are typically fabricated with varying degrees of field of view and light uniformity. The field of view is controlled by a primary lens which is typically integrated with the LED housing. The uniformity is -typically dependent on the quality of the silicon die and the placement of the die on -the substrate material. The variation in field of view and uniformity can typically lead to a "donut" shaped image being projected on a surface which resides within a near field.

The present invention provides an optical coupling assembly in a computer input device between a radiation source and an image sensor.

An emitter lens is provided between the radiation source and the work surface to be illuminated. The emitter lens collects radiation and reshapes the illumination pattern to increase intensity and uniformity. The radiation source and emitter lens have associated housings which act to properly orient and align the emitter lens and radiation source. The emitter lens also acts to space the radiation source from an aperture in a housing of the computer input device to provide protection against damage due to electrostatic discharge (ESD).

An imaging lens is provided between the work surface and the image sensor to focus light reflected from the work surface onto the image sensor. An imaging lens housing or holder is provided to properly orient and align the imaging lens with the image sensor. The imaging lens housing provides an apron which increases ESD discharge path length. The imaging lens housing also provides bias members and a lens/sensor interface which act to accurately locate the imaging lens closely proximate the image sensor.

BRIEF DESCRIPTION OF THE DRAWINGS

FIG. 1 is a block diagram of an exemplary environment for implementing an input device in accordance with the present invention.

FIG. 2A is a functional block diagram of a computer and an input pointing device as used in one embodiment of the present invention.

FIG. 2B illustrates one example of a packet of information generated by an input pointing device for transmission to the computer.

FIG. 3 illustrates a computer input device, shown in partial sectional and partial block diagram form, in accordance with one embodiment of the present invention.

FIG. 4A illustrates one embodiment of a light pattern disposed on a work surface.

FIG. 4B illustrates an embodiment of a light pattern disposed on the work surface in accordance with one embodiment of the present invention.

FIG. 5 illustrates a collection and shaping emitter lens in accordance with one aspect of the present invention.

FIG. 6 is a side sectional view of a portion of a computer input device in accordance with one aspect of the present invention.

FIGS. 7A and 7B illustrate an LED housing in accordance with one feature of the present invention.

FIG. 7C is an exploded view illustrating an emitter lens housing, the emitter lens generally described with respect to FIG. 5 and the LED housing described with respect to FIGS. 7A and 7B.

FIGS. 8A and 8B illustrate an emitter lens housing, or tunnel, in accordance with one feature of the present invention.

FIG. 9 illustrates the emitter lens housed in the lens housing shown in FIGS. 7C, 8A and 8B.

FIGS. 10A and 10B illustrate the emitter lens, lens housing, LED and LED housing all assembled a computer input device in accordance with one aspect of the present invention.

FIG. 10C illustrates the assembly shown in FIG. 10A, with a printed circuit board assembled thereon.

FIG. 11 is a side sectional view of the portion of the computer input device shown in FIG. 6, with an image sensing circuit assembled thereon.

FIG. 12 is an enlarged side view of one illustrative embodiment of an image sensor which can be utilized with the present invention.

FIGS. 13A and 13B illustrate an imaging lens holder in accordance with one feature of the present invention.

FIGS. 14A and 14B illustrate the imaging lens holder shown in FIGS. 13A and 13B.

FIG. 15 is a cross-sectional view of the imaging lens holder and imaging lens taken along section lines 15—15 in FIG. 14A.

FIG. 16 is a larger cross-sectional view of the imaging lens holder illustrating its relationship with respect to the printed circuit board which holds the image sensor in accordance with one aspect of the present invention.

FIG. 17 is an enlarged view of an alternate embodiment of an imaging lens holder in accordance with one aspect of the present invention.

FIG. 18 is an enlarged view of another embodiment of an imaging lens holder in accordance with one aspect of the present invention.

DETAILED DESCRIPTION OF THE ILLUSTRATIVE EMBODIMENTS

The present invention provides a user input device for generating position information and providing that information to a computer system. The position information is generated based on detected movement of the user input device, or a portion thereof. The movement is detected by identifying a pattern or image on a surface movable relative to the user input device and monitoring relative movement of the pattern. An optical coupling is provided between a source of radiation for illuminating the surface and a detector detecting the pattern or image. The optical coupling provides one or more advantages, such as increasing uniformity of illumination, effectively amplifying the radiation to increase illumination of the surface, providing increased electrostatic discharge (ESD) protection, and/or providing ease of manufacturing.

While a portion of the present description proceeds with reference to a mouse-type pointing device, it will be appreciated that the present invention can be implemented in any type of computer input device which generates a signal based on detected movement of one surface relative to another. For example, the present invention can be used to detect movement of a trackball, and to detect switch depressions, wheel rotations and mouse movements, to name a few.

Overview

FIG. 1 and the related discussion are intended to provide a brief, general description of a suitable computing environment in which the invention may be implemented. Although not required, portions of the specification will be described, at least in part, in the general context of computer-executable instructions, such as program modules, being executed by a personal computer or other computing device. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, game consoles and the like. The invention is also applicable in distributed computing environments where tasks are performed by remote processing devices that are linked through a communications network. In a distributed computing environment, program modules may be located in both local and remote memory storage devices. The computer input device of the present invention may be useful in all such environments.

With reference to FIG. 1, an exemplary environment for the invention includes a general purpose computing device in the form of a conventional personal computer 20, including processing unit 21, a system memory 22, and a system bus 23 that couples various system components including the system memory to the processing unit 21. The system bus 23 may be any of several types of bus structures including, for instance, a memory bus or memory controller, a peripheral bus, and a local bus using any of a variety of bus architectures. The system memory includes read only memory (ROM) 24 and random access memory (RAM) 25. A basic input/output 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device (or mouse) 42. Other input devices (not shown) may include a microphone, joystick, game pad, satellite dish, scanner, trackball or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices such as speakers and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

For a better understanding of the present invention, a brief discussion of mouse message processing is now provided. For clarity, the present discussion proceeds with respect to the computer input device being implemented as a mouse and processing of a mouse message having a specific packet and structure. Of course, as discussed above, other types of computer input devices are contemplated, as are other types and structures of messages, packets, etc. FIG. 2A is a functional block diagram of computer 20 used with input device 42 in accordance with one embodiment of the present invention. Mouse 42 illustratively has right and left buttons and a depressible, rotatable wheel 103 there between. However, the mouse 42 may have more actuators (such as thumb actuation buttons or more finger actuation buttons) or fewer actuators (such as only a single button or two buttons) or different types of actuators (such as triggers, rollers, etc.), or any combination. The block diagram of computer 20 shown in FIG. 2A includes a number of the items discussed with respect to FIG. 1, and those items are similarly numbered. However, the block diagram in FIG. 2A also shows a number of components in greater detail which are used in processing a mouse message. Computer 20 includes mouse driver 60, message hook procedure 62, and focus application 64. To better understand the operation of input device 42 in computer system 20 shown in FIG. 2A, the components of that system are discussed in connection with a data structure illustrated in FIG. 2B. Of course, it will be appreciated that rearrangement of the data portions within the data structure or different data portions can be used as well. For example, where different actuators are used, the data structure will change accordingly.

FIG. 2B illustrates a four-byte -mouse packet .66 in a row and column format with bytes 68, 70, 72, and 74 shown in rows and the individual bits of each byte shown in columns. Byte 68 is the first byte provided by input device 42, byte 70 is the second byte, byte 72 is the third byte, and byte 74 is the fourth byte. The columns of bits are organized with the least significant bits on the far right and the most significant bits on the far left. Thus, column 76 includes the least significant bits of each of the four bytes and column .78 includes the most significant bits of the four bytes.

Within mouse packet 66, first byte 68 includes left button bit 80, right button bit 82, and middle button bit 84. A one in the left button bit 80 indicates that the left button is depressed and a zero in left button bit 80 indicates the left button is not depressed. Similarly, a one in the right button bit 82 or middle button bit 84 indicates that the right button or the middle button, respectively, are depressed and a zero in either of these bits indicates that their respective button is not depressed.

Fourth bit 86 is set to a one.

Fifth bit 88 of byte 68 is the ninth bit of a 9-bit signed value that is completed by byte 70. The 9-bit value produced by the combination of bit 88 and byte 70 represents the direction and magnitude of movement of the mouse along the X-coordinate. Since the 9-bit value is in two's complement format, bit 88 indicates the direction of mouse movement such that if it has a value if zero, mouse movement is in a positive X direction and if it has a value of one, mouse movement is in the negative X direction.

Sixth bit 90 of first byte 68 is the ninth bit of a 9-bit signed value that is completed by byte 72. The combination of bit 90 and third byte 72 produces a value that indicates the magnitude and direction and movement of the mouse along the Y coordinate. Since this value is a two's complement signed value, bit 90 indicates the direction of movement along the Y coordinate such that if it has a value of one, the mouse movement is in a negative Y direction and if it has a value of zero, the mouse movement is in a positive Y direction.

Seventh bit 92 and eighth bit 94 of first byte 68 indicate whether the 9-bit values formed by bit 88 and byte 70 and by bit 90 and byte 72, respectively, have incurred an overflow condition. This occurs when more than nine bits of movement have been detected by the mouse. In this condition, the respective 9-bit value should be set to its maximum magnitude for the direction of movement.

The least significant four bits 96, 98, 100 and 101 of fourth byte 74 represent the direction and magnitude of movement of wheel 103 (illustrated in FIG. 2A). The value represented by bits 96–101 is a signed value wherein a positive value indicates wheel motion toward the user and a negative value indicates wheel motion away from the user.

Bits 105 and 107 are the fifth and sixth bits of byte 74, respectively, and indicate closure of switches corresponding to the left and right buttons, respectively, of mouse 42. Thus, when bit 105 has a value of one, the switch associated with the left button is closed indicating that the corresponding mouse button has been depressed. Bit 107 reflects closure of the switch associated with right mouse button in a similar fashion.

Bits 109 and 111 of fourth byte 74 are reserved for later use and are set to zero. Those skilled in the art will recognize that mouse packet 66 illustrated in FIG. 2B and the serial interface 46 described below are used in PS/2 and serial mouse connections. For universal serial bus (USB) connections, the mouse information is sent to the mouse driver using publicly available USB protocols for mice.

In order to describe the processing of a conventional mouse message, reference is made to both FIGS. 2A and 2B. To initiate a mouse message, the user first manipulates mouse 42. Based on this manipulation, mouse 42 generates a mouse packet that is passed to serial interface 46 and which is indicative of the manipulation event. When serial interface 46 receives mouse packet 66, it converts the serial information in mouse packet 66 into a set of parallel packets and provides the parallel packets to mouse driver 60. Mouse driver 60 creates a mouse message based on the manipulation event. The creation of the mouse message is identical to the manner in which existing mice create mouse messages.

The mouse message is then transmitted to operating system 35. In one illustrative embodiment, operating system 35 is a "WINDOWS NT®", a "WINDOWS 95®", or a "WINDOWS 98®", brand operating system (provided by Microsoft Corporation of Redmond, Washington). Of course, other operating systems can be used as well, such as OS/2 available from IBM Corporation of Armonk, N.Y. or UNIX. Operating system 35 includes a mouse message hook list that identifies a series of mouse message hook procedures 62. When operating system 35 receives the mouse message from mouse driver 60, it examines the mouse message hook list to determine if any mouse message hook procedures have registered themselves with operating system 35. If at least one mouse message hook procedure has registered itself with operating system 35, operating system 35 passes the mouse message to the registered mouse message hook procedure 62 that appears first on the list.

The called mouse message hook executes and returns a value to operating system 35 that instructs the operating system to pass the mouse message to the next registered mouse message hook.

The mouse message may, for example, represent a command to an application which owns the window currently under focus in computer 20. In that instance, the message hook procedure 62 issues the command to the focus window application. In response, the focus window application 64 performs the desired function.

After the message hook procedure 62 issues the command to the focus application 64, the message hook procedure 62 consumes the mouse message by removing the message from the message chain. This is accomplished by returning a value to operating system 35 which indicates to the operating system that it should not pass the mouse message to any other message hook procedures.

FIG. 3 is a more detailed diagram, in partial block form and partial schematic, form, illustrating a computer input device, such as mouse 42, in accordance with one embodiment of the present invention. Mouse 42 includes housing 102, electromagnetic radiation source (which may simply be a light source such as an LED) 104, aperture 106 defined in the bottom of housing 102, optical coupler 107, optical coupler 108, image or pattern detector 110, controller 112, and current driver 114. In FIG. 3, mouse 42 is shown supported relative to work surface 116. Pattern detector 110 can be any suitable detector which is capable of detecting images or patterns from information carried by electromagnetic radiation impinging thereon and providing a signal indicative of such patterns or images, and may be an artificial retina pattern detector as described in greater detail below, for example.

Light source 104 can be any suitable source of electromagnetic radiation which can be used to provide radiation for impingement on a pattern or image and which can then be detected by pattern detector 110. In one illustrative embodiment, light source 104 includes LED 118 and integral lens 120. Source 104 could also be a surface mounted LED, or low grade lasers (with a wavelength in the nanometer range), for example.

Radiation emitted from LED 118 is transmitted through integral lens 120 (which is illustratively a dome shaped clear optical piece of material such as glass or plastic integral with the casing of LED 118) such that it impinges on optical coupler 107. As is described in greater detail below, optical coupler 107 collects radiation emitted by LED 118 and shapes transmitted radiation into a desired shape. The radiation exits optical coupler 107 and passes through aperture 106 in housing 102 and impinges upon work surface 116 which can optionally have no predetermined pattern thereon, or a predetermined pattern or image thereon. The light then reflects off of work surface 116 toward optical coupler 108.

Optical coupler 108 illustratively includes a lens which collects the radiation reflected from surface 116 and directs it to image detector (e.g., artificial retina) 110. It should be noted that the lens in optical coupler 108 can be eliminated with the addition of lenses on either LED 118, image detector 110, or both. Similarly, the lens in optical coupler 108 can simply be eliminated if the radiation is detectable by the detector, such that the image or pattern can be detected, without a lens.

Image detector 110 generates an image signal indicative of an image or pattern on work surface 116 based on the radiation reflected from work surface 116. The image signal is provided to controller 112 which, in one illustrative embodiment, computes position information based on the image signal. The position information indicates movement of mouse 42 relative to work surface 116, as is described in more detail in the above-identified patent applications which are hereby fully incorporated by reference. Position information is provided by controller 112 in the form of an information packet, through an output such as a cable (not shown), to computer 20 illustrated in FIGS. 1 and 2A. Mouse 42 may also provide the output from controller 112 through a wireless transmission link such as infrared, ultrasonic, or radiofrequency links. In an illustrative embodiment, the position information provided by controller 112 is provided according to a conventional format, such as through a serial interface, a universal serial bus (USB) interface, or in any other interface format.

Image detector 110, in one illustrative embodiment, is an artificial retina manufactured by Mitsubishi Electric Corporation and includes a two-dimensional array of variable sensitivity photo detectors (VSPDs) which operates in a known manner. Briefly, the VSPDs are formed by a side-by-side pair of diodes integrated onto and separated by a semi-insulated GaAs layer (pn-np structure). In one embodiment, the array is a 32×32 element array, but could be larger or smaller as desired. The photo detector current depends, both in sign and magnitude, on applied voltage. Such VSPDs exhibit an analog memory affect which stores conductivity information when a voltage is applied in the presence of an optical write pulse. This information is retrieved by injecting an optical readout pulse.

Image processing in such devices is based on optical matrix-vector multiplication. An input image is projected onto the device as a weight matrix. All VSPDs have one electrode connected along rows, yielding a sensitivity control vector. Thus, the VSPD sensitivity can be set to arbitrary values in each row within a certain range. In addition, the remaining VSPD electrode is connected along columns, yielding an output current vector defined by the matrix vector product of the weight matrix times the sensitivity control vector.

In an illustrative embodiment, image detector 110 is controlled to perform edge extraction operations. The sensitivities of two adjacent detector rows are set to +1 and −1, respectively, whereas all other sensitivities are set at 0. In this embodiment, the output current is proportional to the difference in light intensities of the two active rows. By shifting the control voltage pattern in a cyclical manner (0, +1, −1, 0, 0, etc.), the horizontal edges of the input image are sensed. Thus, the system operates in a time sequential and semi-parallel mode.

In one illustrative embodiment, mouse 42 also includes current driver 114 which is coupled to source 104. In that embodiment, controller 112 can be configured to intermittently sense the intensity of the radiation generated by source 104 and adjust the current provided to source 104 through current driver 114. In other words, if the sensed intensity is lower than a desired range, controller 112 provides a feedback signal to current driver 114 to boost the current provided to source 104 in order to increase the intensity of the electromagnetic radiation emanating from source 104. If, on the other hand, the intensity of the radiation is higher than a desired range, controller 112 provides the feedback signal to current driver 114 to reduce the current provided to source 104 to thereby reduce the intensity of the radiation emitted from source 104. This may be done, for example, to reduce the overall power consumption of mouse 42.

One precise way in which controller 112 receives the image signal from image detector 110 and processes the image signal to generate position information is set out in the co-pending patent applications mentioned above. Therefore, that processing is not described in any greater detail here.

OPTICAL COUPLING ASSEMBLY

In one illustrative embodiment, image detector 110 is configured to detect microscopic surface roughness or color variation on work surface 116. In that embodiment, position information can be generated as mouse 42 is moved over substantially any surface. In detecting the surface roughness or color, image detector 110 and controller 112 are configured to look for shadows which show up as dark spots in the optical field of view through aperture 116. In order to create shadows based on the surface roughness, radiation source 104 is disposed at an angle α relative to generally planar surface 116. In one illustrative embodiment, α is approximately 20 degrees. However, α could be disposed at substantially any angle between 0 degrees and 90 degrees, so long as image detector 110 and controller 112 can detect the surface roughness.

In any case, a number of problems can exist with current, commercially available, LEDs. For example, typical LEDs provide radiation in a "donut" shape such that a relatively narrow, generally circular, band of higher intensity radiation is emitted. The band is concentrically surrounded by an inner region of lower radiation and an outer region of lower radiation which dissipates with radial distance from the radial center of the band. Because image detector 110 and controller 112 are looking for dark spots, or shadows, it is important that the radiation illuminate the field of view on surface 116 uniformly such that shadows or dark spots can be accurately detected and such that movement of those shadows or dark spots can be accurately followed.

Another problem associated with conventional LEDs is that they typically require a higher drive current in order to achieve higher intensity. In accordance with one illustrative embodiment of the present invention, as the intensity of the radiation illuminating the field of view on surface 116 increases, image detection or pattern detection can be accomplished more accurately by image detector 110 and controller 112. Therefore, it can be desirable to have a higher intensity radiation impinging on surface 116 from source 104. Of course, when higher intensity radiation requires higher drive current, this can increase heat dissipation in source 104 and shorten the useful life of source 104. Similarly, increased drive current also increases the overall power consumption of mouse 42.

In addition, commercially available devices, such as computer input devices, must meet certain safety specifications relating to light intensity. For example, the smaller the light source, the closer the eye can be permitted to come and still meet the eye safety specification. Meeting this specification also renders it more difficult to attain surface illumination of the desired intensity.

Also, conventional LEDs are provided with bare metal wires, leads, or similar-type conductors over which the LED receives power. Commercial computer input devices must also meet an electrostatic discharge (ESD) specification. Briefly, that specification provides that, from an opening in a housing of the device, any electrostatic discharge path must exceed a minimum threshold distance or have other ESD dissipation or clamping circuitry disposed thereon. For instance, in one specification, the ESD discharge path between an opening in the housing and any exposed leads in the housing must exceed approximately 25 mm.

Further, as discussed above, source 104 is illustratively provided at an angle relative to work surface 116. However, this results in an oblong radiation pattern, such as radiation pattern 130 illustrated in FIG. 4A. Oblong pattern 130 is generated by emitted radiation impinging on surface 116 in the direction generally indicated by arrows 132. Assuming the field of view being viewed by image detector 110 is designated by numeral 134, it can be advantageous to reshape the illumination pattern 130 by pulling in the oblong ends of pattern 130 in the direction generally indicated by arrows 136. Similarly, it can be advantageous to extend the generally central portion of illumination pattern 130 in the direction generally indicated by arrows 138. Reshaping illumination pattern 130 in this way results in illumination pattern 140 generally illustrated in FIG. 4B. It can be seen that by redirecting radiation to accomplish pattern 140, the intensity in the area of field of view 134 increases, as does the uniformity of the illumination. Also, it may be desirable for the pattern of illumination to be another shape, such as generally square, rectangular, etc. The present invention can be utilized to accomplish this as well.

In order to address a number of the disadvantages associated with conventional LEDs, as discussed above, one embodiment of the present invention provides optical coupler 107 as generally illustrated in FIG. 5. In the embodiment illustrated in FIG. 5, optical coupler 107 has an inlet end 142 and an outlet end 144, and a radiation coupling portion 146 extending therebetween. In an illustrative embodiment, inlet end 142 is generally convex such that it acts to collect radiation emitted by source 104. Inlet end 142 is also illustratively disposed in close proximity, or adjacent, source 104. In the embodiment illustrated in FIGS. 3 and 5, inlet end 142 is located very closely adjacent lens 120 on LED 104.

Light conducting portion 146 acts to conduct the collected light which enters through inlet end 142 axially along lens 107 to outlet end 144. Outlet end 144, in one illustrative embodiment, has a generally concave shape which acts to reshape the illumination pattern which impinges on surface 116, so that the pattern is more circular (such as that shown in FIG. 4B).

Therefore, optical coupler 107 addresses a number of the disadvantages associated with conventional LEDs. First, optical coupler 107 has inlet end 142 which acts to collect radiation emitted by source 104. This tends to increase the intensity of radiation emitted at the outlet end 144 of coupler 107. In addition, the outlet end 144 is configured to reshape the illumination pattern which impinges on surface 116. This increases the intensity and uniformity of the radiation impinging on the field of view area 134 which is viewed by image detector 110. Similarly, the central portion 146 of optical coupler 107 has a length which is sufficient to remove radiation source 104 from aperture 106 by an amount which reduces the likelihood that electrostatic discharge will reach any exposed leads or wires within housing 102. In one illustrative embodiment, the optical coupler 107 has an axial length which is sufficient such that exposed wires powering source 104 are removed from aperture 106 by in excess of about 25 mm.

It can thus be appreciated that, in order to provide repeatability and accuracy in manufacturing mouse 42, and in order to ensure that inlet end 142 of optical coupler 107 receives and collects the desired amount of radiation, and outlet end 144 directs that radiation to an appropriate spot on surface 116, it is important that optical coupler 107 and source 104 be well aligned with one another. Similarly, it is important that outlet end 144 be well aligned with aperture 106. In addition, many conventional LEDs have emission patterns which are rotationally variable (e.g., the pattern changes slightly with rotation about a longitudinal axis of the LED). In one embodiment, optical coupler 107 is also rotationally sensitive. Therefore, not only is it important that optical coupler 107 and source 104 be appropriately axially aligned with one another, it can also be important that optical coupler 107 and source 104 be rotationally oriented properly relative to one another.

FIG. 6 is a side sectional view of a portion of mouse 42 in accordance with one illustrative embodiment of the present invention. FIG. 6 illustrates that mouse 42 has a lower housing 150 which defines aperture 106 therein. FIG. 6 also illustrates optical coupler 107 coupled closely adjacent source 104 (which in the embodiment illustrated in FIG. 6 is an LED). In order to accomplish alignment between optical coupler 107 and LED 104, bottom wall 150 is provided with a receiving region, or ramp 152. As is described in greater detail later in the specification, ramp 152 includes a generally inclined tunnel for receiving the outlet end 144 of optical coupler 107. In addition, in order to further accomplish alignment, mouse 42 includes an LED support housing 154. Support housing 154 is described in greater detail below, and receives LED 104. Housing 154 also includes locator posts, one of which is designated by numeral 156. Locator posts 156 are disposed within corresponding apertures in a circuit board 158. When posts 156 are seated within the apertures in circuit board 158, housing 154 is disposed at an angle relative to work surface 116 which is generally similar to that at which optical coupler 107 is disposed. In addition, housing 154 locates the emission end of LED 104 closely proximate the inlet end 142 of optical coupler 107.

Light is emitted from LED 104 and collected and transmitted to aperture 106 by optical coupler 107. The light is then reflected upwardly through an imaging lens 155 held by a lens holder 157, through an opening 206 in printed circuit board 158, and impinges upon image detector 110, which in the embodiment illustrated in FIG. 6, is an integrated circuit device. Opening 206 is sized to allow image detector 110 to be mounted thereover, and to have its sensitive detector array aligned with lens 155. The optical coupling assembly used to transmit reflected radiation, reflected from work surface 116, to image detector 110, is discussed later in the specification with respect to FIGS. 10C–18.

FIGS. 7A and 7B better illustrate LED housing 154. FIG. 7A is a side view of LED housing 154 and FIG. 7B is a rear view, taken from a rear side 160 of LED housing 154. FIG. 7A illustrates that LED housing 154 actually has a plurality of locator posts 156 which are offset, in one illustrative embodiment, in a direction from front to rear along housing 154. FIG. 7A also illustrates that a tunnel or aperture, shown in phantom and illustrated by numeral 161, extends through housing 154 from rear end 160 to forward end 162 thereof. FIG. 7A also illustrates that a pair of notches or steps 164 are provided on either side of opening 161 on front end 162 of housing 154.

FIG. 7B illustrates that, in one illustrative embodiment, locator posts 156 are not only offset front to back, but are offset from side to side on housing 154. FIG. 7B further illustrates that, in one illustrative embodiment, opening 161 is defined by an inner periphery of housing 154 having a flattened side 166. Flattened side 166 is configured to mate with a commercially available LED which has a flattened side thereof. In this way, during assembly, the LEDs will always be placed in a similar rotational orientation within housing 154.

FIG. 7C is an exploded view illustrating the assembly and alignment of optical coupler 107 and LED housing 154. FIG. 7C illustrates that optical coupler 107, in one illustrative embodiment, includes a top flange 168 and a pair of side flanges 170 and 172. Flanges 168–172 are illustratively integrally formed with optical coupler 107. However, they could also be formed as discrete pieces connected thereto.

In any case, optical coupler 1.07 is inserted within tunnel 152 in the housing 150 of mouse 42. Tunnel portion 152 includes an interior cavity 174 for receiving the outlet end 144 of optical coupler 107. Optical coupler 107 slides within cavity 174 until the forward ends of flanges 168–172 abut the wall 176 defining cavity 174. Flanges 168–172 thus preclude further advancement of optical coupler 107 within cavity 174. In this way, optical coupler 107 is disposed at the desired downward angle (e.g., approximately 20 degrees) toward aperture 106. Housing 154 is then located on printed circuit board 158 with locator pins 156. Once they are located, steps or notches 164 rest on, and exert a slightly downward pressure on, the rearward ends of flanges 170 and 172. The forward end of housing 154, just below notches 164, also nests against the rearward surface of flanges 170 and 172 to keep optical coupler 107 from moving rearwardly, out of cavity 174.

FIGS. 8A and 8B are isometric views which better illustrate the portion of housing 150 of mouse 42 which forms ramp portion 152. FIGS. 8A and 8B illustrate that wall 176 includes a ramp section 178 which has a generally convex portion 180 and a pair of standoff portions 182 and 184. The upper portion of wall 176 abuts the forward end of flange 168 on optical coupler 107, while the side flanges 170 and 172 on optical coupler 107 ride along standoff portions 182 and 184. In this way, ramp portion 152 of housing 150 ensures that optical coupler 107 is properly oriented within cavity 174.

It can also be important that light emitted by LED 104 not be generally free to radiate throughout the housing which defines the interior of mouse 42. Therefore, FIGS. 8A and 8B illustrate that ramp portion 152 is provided with an extending wall 186. Wall 186 extends above, and generally encloses, three sides of ramp portion 152. This helps to preclude emissions of radiation from LED 104 throughout the housing.

FIG. 9 is an enlarged view of optical coupler 107 seated within cavity 174. FIG. 9 better illustrates the forward ends of flanges 168, 170, and 172 in abutment with wall portion 176, and the lower portions of flanges 170 and 172 riding along ramp standoff portions 182 and 184.

FIGS. 10A–10C better illustrate optical coupler 107, LED 104, and LED housing 154. FIGS. 10A and 10B illustrate optical coupler 107, LED 104 and housing 154 coupled to one another in a lower housing portion of mouse 42, without printed circuit board 158 assembled therein. FIG. 10C illustrates the same assembly, except that circuit board 158 is provided within the housing. FIG. 10A better illustrates that notch 164 on LED housing 154 similarly rides on an upper surface of flange 170. It will be appreciated that an oppositely disposed notch 164, on an opposite side of housing 154 to that shown in FIG. 10A, rides on flange 172. FIG. 10A also better illustrates that the portion of housing 154 just below notch 164 rides on an axial end of flange 170, to preclude movement of optical coupling device 107 rearwardly, toward housing 154, and out of the cavity 174 in which it is disposed.

FIGS. 10A and 10B also illustrate that LED 104 is illustratively provided with a pair of power leads 190 and 192 which project generally rearwardly therefrom and extend downwardly within slots 194 and 196 in flange 198 which extends rearwardly from housing 154. In one illustrative embodiment, flange 198 is integrally formed with housing 154. It can thus be seen that optical coupler 107 provides a significant offset between aperture 106, in the lower housing of mouse 42 and the exposed leads 190 and 192 of LED 104.

FIGS. 10A and 10B also illustrate that, in one illustrative embodiment, the lower housing portion 150 of mouse 42 is provided with a number of standoffs 200 and a plurality of clips 202. Printed circuit board 158 (illustrated in FIG. 10C) is supported by standoffs 200 and held in place by clips 202.

FIG. 11 is a side sectional view of a portion of mouse 42 similar to that shown in FIG. 6, and similar items are correspondingly numbered. FIG. 11 illustrates optical coupler 108 in some detail, as including imaging lens 155 and an ESD shield 300. Lens 155 is, in one illustrative embodiment, integrated with ESD shield 300 (which is shown in greater detail later in the specification with respect to FIGS. 13A–14B) using a conventional injection molding process in which ESD shield 300 is injection molded around lens 155. ESD shield 300 is illustratively formed of a commercially available polycarbonate material sold under the designation LEXAN 141. FIG. 11 also illustrates that ESD shield 300 extends in a first direction from lens 155 toward optical coupler 107 and in a second direction from lens 155 away from optical coupler 107. In the direction away from optical coupler 107, ESD shield 300 provides a channel 302 which receives a fence portion 304 which protrudes from the lower surface 150. This nesting arrangement effectively increases the electrostatic discharge path in that direction. In other words, an electrostatic discharge traveling through aperture 106, around lens 155, and in the direction away from optical coupler 107, must traverse fence 304 first in the upward direction, and then in the downward direction, and then further advance away from optical coupler 107 until it reaches the outward end of ESD shield 300 before it can contact any exposed leads.

FIG. 12 is a side view of one illustrative embodiment of image detector 110. In the embodiment illustrated in FIG. 12, image detector 110 includes an integrated circuit portion 304 having a sensitive area 306, and an aperture plate 308. In the embodiment illustrated in FIG. 12, aperture plate 308 has a depending portion 310 with an aperture therein for allowing radiation to pass therethrough and impinge on sensitive area 306.

FIGS. 13A and 13B are isometric views of ESD shield 300. FIGS. 13A and 13B illustrate that ESD shield 300 has an extending wall portion 312, a lens holding area 314, a plurality of projections 316 and a plurality of resilient bias members 318, each having a depending foot 320 thereon. FIGS. 13A and 13B also illustrate that ESD shield 300 has a transition portion 322 which transitions between wall 312 and lens holding are 314.

Feet 320 of resilient members 318 illustratively extend downwardly below the lower surface of ESD shield 300. Therefore, feet 320, in an unbiased position, elevate ESD shield 300 slightly off the lower surface 150 of mouse 42. However, resilient members 318 are formed substantially as cantilevered beams extending from a remainder of ESD shield 300 to provide resilience for biasing lens holding area 314 toward image detector 110, as is described in greater detail below.

FIGS. 14A and 14B are isometric views of ESD shield 300 assembled onto the lower housing portion 150 of mouse 42. FIGS. 14A and 14B illustrate that wall portion 312 generally defines an inner periphery which is larger than wall portion 186. Wall portion 312 is also, in one illustrative embodiment, taller than wall portion 186. Thus, wall portion 312 of ESD shield 300 provides additional ESD protection in the area of wall 186.

FIGS. 14A and 14B also illustrate that ESD shield 300 extends in all radial directions away from lens holding area 314. Therefore, when ESD shield 300 is formed, and imaging lens 155 is integrally molded within lens holding area 314 through a well known injection molding process, printed circuit board 158 and all bare leads or conductors are mounted within the housing of mouse 42 above ESD shield 300. Aperture 106 in the bottom of the housing of mouse 42 is thus effectively separated from any bare leads or wires by an ESD path which is defined, at a minimum, by the outer periphery of ESD shield 300.

Not only does ESD shield 300 provide an ESD barrier, it also enhances alignment between lens 155 and image detector 110. FIG. 15 is a partial sectional view of an interface between an image detector 110 and ESD shield 300, taken along section lines 15—15 in FIG. 14A. FIG. 15 illustrates that lens holding area. 314 is defined by a wall which has an inner periphery which is flared slightly outwardly. The inner periphery of lens holding area 314 is also sized to receive a portion of aperture plate 310 of image detector 110. When circuit board 158 is snapped into place within the housing of mouse 42, aperture plate 310 exerts a downward pressure on the wall defining lens holding area 314. The bias members 318 on the corners of ESD shield 300 provide an opposing bias force, which opposes the downward deflecting force imparted by the printed circuit board. This causes the wall defining area 314 to nest with, and become aligned with, aperture plate 310. This alignment action brings lens 155 into close proximity with aperture plate 310, and also operates to tightly align lens 155 with aperture plate 310.

FIG. 16 is a side sectional view of a portion of ESD shield 300 with printed circuit board 158 assembled thereover. FIG. 16 shows that, in one illustrative embodiment, there is a slight clearance between projections 316 on ESD shield 300 and the lower surface of printed circuit board 158. In this way, if either printed circuit board 158 or ESD shield 300 rotate or tilt in the direction indicated by arrows 322, only a small degree of such rotation will be accommodated. The bottom surface of printed circuit board 158 will then engage the upper surface of a corresponding projection 316. Such engagement precludes further rotation in that direction and enhances alignment between imaging lens 155 and image detector 110.

FIG. 17 illustrates an alternative embodiment for coupling lens 155 to the lower housing 150 of mouse 42. Rather than providing an ESD shield (such as shield 300 described above) integrally molded with, or integrally coupled to, lens 155, the embodiment illustrated in FIG. 7 simply shows that the bottom surface 150 of the housing of mouse 42 is provided with lens receiving block 350. Lens receiving block 350 has an opening therein sized to snugly receive the outer periphery of lens 155. Lens 155 is then simply adhered within the opening in block 350 using an optical grade adhesive, using a frictional fit, or using.a mechanical clamp or other securing device. In that embodiment, since lens 155 is secured directly to the bottom housing of mouse 42, there can be no electrostatic discharge upwardly through the aperture. Therefore, ESD shield 300 can be eliminated.

FIG. 18 illustrates yet another alternative embodiment of securing lens 155 within mouse 42. In FIG. 18, block 350 is provided as shown in FIG. 17. However, rather than securing lens 155 within the opening in block 350 using adhesive, block 350 has an interior groove which receives an o-ring 352. O-ring 352, in one illustrative embodiment, is formed of a silicone or pliable rubber material. In that embodiment, lens 155 can be inserted within the opening and secured therein using a frictional fit, or a snap-type fit. Lens 155 and o-ring 352 thus effectively seal the opening from electrostatic discharge.

Other alternate embodiments are also contemplated. For example, optical coupler 107 can be split into two or more pieces along its longitudinal axis. Further, inlet end 142 of optical coupler 107 can be secured to LED 104 using adhesive or a mechanical housing disposed about LED 104 and end 142. Outlet end 144 can be secured within cavity 174 using other means, other than LED housing 154. For example, outlet end 144 of optical coupler 107 can be adhered within cavity 174 or secured therein using a discrete mechanical clamp. Also, bias members 318 can be embodied as other devices, such as separate springs or spring members, and there can be more or fewer bias members 318 than are illustrated.

Again, while the above description has proceeded at some points with respect to a mouse, the present invention can be used with any type of computer input device in which movement is detected. For example, and as set out in the applications incorporated by reference, the present invention can be used with a trackball. In that case, the optical couplers 107 and/or 108 can be inserted between the radiation source and the trackball surface and between the trackball surface and the image sensor, respectively. A similar arrangement can -be used to detect movement of substantially any surface relative to the image detector.

CONCLUSION

It can thus be seen that one illustrative embodiment of the present invention provides an optical coupling assembly on one or both of the radiation emission end and the radiation detection end of the computer input device. The optical coupling assemblies provide one or more advantages. For instance, the optical coupling assemblies serve to align the optical components thereof while maintaining ease of assembly. In addition, the optical coupling assemblies overcome a number of disadvantages associated with commercially -available light sources (such as LEDs). The optical coupling assemblies serve to increase intensity and uniformity of the surface being illuminated by the light source, while decreasing the required drive current. The optical assemblies also enhance ESD protection, and provide proper orientation of orientation sensitive parts.

It should also be noted that the particular prescription of any lens or lensing elements mentioned herein are determined using well known optical design techniques. Such prescriptions are typically dependent on the distances of the lens from light sources and surfaces to be illuminated, desired focal points, desired illumination patterns, sizes of the components involved, angles of impingement, desired intensity, etc.

Although the present invention has been described with reference to preferred embodiments, workers skilled in the art will recognize that changes may be made in form and detail without departing from the spirit and scope of the invention.

What is claimed is:

1. A coupling assembly in a computer input device having a first housing portion with an aperture therein, a radiation source, and an image detector, the radiation source emitting radiation through the aperture and the image detector receiving radiation reflected off of a work surface over which the computer input device is used, the coupling assembly comprising:
  a source housing coupled to the radiation source;
  a first optical coupler, having a longitudinal length and generally defining a substantially linear longitudinal axis, a collection end located proximate the radiation source and an emitting end emitting radiation collected by the collection end to form an illumination pattern on the work surface, the first optical coupler being disposed generally between the source housing and the aperture in the first housing portion; and a first optical coupler housing supporting the first optical coupler therein such that its longitudinal axis is at an angle relative to the work surface between 0 and 90 degrees and supporting the first optical coupler to orient the first optical coupler at a predetermined, desired orientation about its longitudinal axis.

2. The coupling assembly of claim 1 wherein the first optical coupler comprises:

a shaping portion shaping the illumination pattern into a desired illumination pattern.

3. The coupling assembly of claim 2 wherein the first optical coupler housing is configured to support the first optical coupler such that radiation emitted by the emitting end thereof impinges on the work surface at an angle between 0 degrees and 90 degrees.

4. The coupling assembly of claim 3 wherein the shaping portion is configured to shape the illumination pattern to increase uniformity of radiation in the illumination pattern.

5. The coupling assembly of claim 4 wherein the shaping portion is configured to provide the desired illumination pattern as substantially circular.

6. The coupling assembly of claim 2 wherein the shaping portion is disposed at the emitting end of the first optical coupler.

7. The coupling assembly of claim 1 wherein the first optical coupler includes an elongate radiation conducting portion between the collection end and the emitting end.

8. The coupling assembly of claim 1 wherein the first housing has an exterior surface which defines the aperture and wherein the first optical coupler housing comprises:

a ramp sized to receive the first optical coupler thereon and to support the first optical coupler.

9. A coupling assembly in a computer input device having a first housing portion with an aperture therein, a radiation source, and an image detector, the radiation source emitting radiation through the aperture and the image detector receiving radiation reflected off of a work surface over which the computer input device is used, the coupling assembly comprising:

a source housing coupled to the radiation source;

a first optical coupler disposed generally between the source housing and the aperture in the first housing portion, a first optical coupler housing supporting the first optical coupler, wherein the first optical coupler comprises:

a collection end located proximate the radiation source, collecting radiation emitted by the radiation source, an emitting end emitting radiation collected by the collection end to form an illumination pattern on the work surface, wherein the first housing has an exterior surface which defines the aperture and wherein the first optical coupler housing comprises:

a ramp sized to receive the first optical coupler thereon and to support the first optical coupler at an angle between 0 degrees and 90 degrees relative to the exterior surface, wherein the first optical coupler includes a plurality of flanges disposed about an outer periphery thereof and engaging the ramp.

10. The coupling assembly of claim 9 wherein the first optical coupler housing further defines a cavity having an inlet sized to receive the emitting end of the first optical coupler.

11. The coupling assembly of claim 10 wherein at least one of the plurality of flanges abuts the first optical coupler housing adjacent the inlet to preclude further movement of the first optical coupler into the cavity.

12. The coupling assembly of claim 10 wherein the first optical coupler housing further comprises:

a wall extending about a portion of the inlet, separating the inlet from the image detector.

13. The coupling assembly of claim 12 wherein the first optical coupler housing is formed integrally with the first housing portion.

14. The coupling assembly of claim 1 wherein the source housing has a first end and a second end, and wherein the first end is located proximate the collecting end of the first optical coupler.

15. The coupling assembly of claim 14 wherein the first end of the source housing engages the first optical coupler, securing the first optical coupler in the first optical coupler housing.

16. The coupling assembly of claim 15 wherein the radiation source is electrically coupled to a circuit board and wherein the source housing includes a plurality of locators sized to fit within locator apertures in the circuit board.

17. The coupling assembly of claim 15 wherein the radiation source includes a characteristic keyed exterior shape and wherein the source housing includes an interior surface shaped to receive the characteristic keyed exterior shape of the radiation source.

18. The coupling assembly of claim 1 and further comprising:

a second optical coupler disposed between the aperture in the first housing portion of the computer input device and the image detector.

19. The coupling assembly of claim 18 wherein the second optical coupler includes:

an imaging lens located generally between the aperture in the first housing portion and the image detector, the imaging lens focusing radiation entering through the aperture in the first housing portion on the image detector.

20. The coupling assembly of claim 19 herein the second optical coupler includes:

an imaging lens mounting assembly coupled to the imaging lens.

21. The coupling assembly of claim 20 wherein the imaging lens mounting assembly comprises:

at least one bias member operably coupled to the imaging lens, biasing the imaging lens to a predetermined location relative to the image detector.

22. The coupling assembly of claim 21 wherein the at least one bias member biases the imaging lens toward the image detector.

23. The coupling assembly of claim 21 wherein the imaging lens mounting assembly includes:

a lens mounting area and an extending portion extending generally radially outwardly from the lens mounting area.

24. The coupling assembly of claim 23 wherein the at least one bias member comprises:

a plurality of resilient members coupled to an outer periphery of the extending portion, each resilient member including a projecting foot located to lift the lens mounting assembly in a direction generally toward the image detector.

25. The coupling assembly of claim 23 wherein the extending portion is formed of electrically insulative material and is sized to extend an electrostatic discharge travel path entering through aperture to a desired length.

26. The coupling assembly of claim 23 wherein the imaging lens mounting assembly is injection molded around the imaging lens so the imaging lens is integral with the imaging lens mounting assembly.

27. The coupling assembly of claim 23 wherein the imaging lens mounting assembly includes:
   an interface configured to align the imaging lens with the image detector under a bias force exerted by the-at least one bias member.

28. The coupling assembly of claim 27 wherein the image detector includes a projecting aperture plate and wherein the interface includes a wall generally defining the lens holding area and shaped to mate with the projecting aperture plate.

29. The coupling assembly of claim 28 wherein the wall generally defining the lens holding area is sized to receive a portion of the projecting aperture plate such that, under the bias force, the interface seeks into alignment with the aperture plate.

30. The coupling assembly of claim 23 wherein the image detector is mounted to a circuit board and wherein the extending portion includes a plurality of projections, spaced from the lens mounting area and projecting toward the circuit board to limit relative movement of the circuit board and the extending portion.

31. The coupling assembly of claim 18 wherein the second optical coupler includes:
   an imaging lens adhesively secured to the lower housing portion of the computer input device adjacent the aperture.

32. The coupling assembly of claim 18 wherein the second optical coupler includes:
   an imaging lens fixedly secured to the lower housing portion of the computer input device adjacent the aperture by a securing mechanism which precludes electrostatic discharge therethrough.

33. The coupling assembly of claim 18 wherein the imaging lens mounting assembly includes:
   a lens receiving cavity adjacent the aperture in the first housing portion, the imaging lens fixedly secured to the first housing portion of the computer input device within the lens receiving cavity by a securing mechanism which precludes electrostatic discharge therethrough.

34. A computer input device comprising:
   a first housing portion with an aperture therein;
   a radiation source;
   an image detector, the radiation source emitting radiation through the aperture and the image detector receiving radiation reflected off of a work surface over which the computer input device is used; and
   a coupling assembly comprising a source housing coupled to the radiation source, a first optical coupler, having a longitudinal length and generally defining a substantially linear longitudinal axis, a collection end located proximate the radiation source and an emitting end emitting radiation collected by the collection end to form an illumination pattern on the work surface, the first optical coupler being disposed generally between the source housing and the aperture in the first housing portion, and a first optical coupler housing supporting the first optical coupler therein supporting the first optical coupler to orient the first optical coupler at a predetermined, desired orientation about its longitudinal axis.

35. The computer input device of claim 34 wherein the first optical coupler includes: a collection end located proximate the radiation source, collecting radiation emitted by the radiation source; and
   an emitting end emitting radiation collected by the collection end to form an illumination pattern on the work surface, the emitting end shaping the illumination pattern into a desired illumination pattern to increase uniformity of radiation on the work surface.

36. A computer input device comprising:
   a first housing portion with an aperture therein;
   a radiation source;
   an image detector, the radiation source emitting radiation through the aperture and the image detector receiving radiation reflected off of a work surface over which the computer input device is used; and
   a coupling assembly comprising an elongate optical conductor; the elongate optical conductor having a longitudinal length and generally defining a substantially linear longitudinal axis, wherein the elongate optical conductor is oriented at a predetermined, desired orientation about its longitudinal axis, conducting radiation from the radiation source toward the aperture and being sized to space the radiation source from aperture by an amount sufficient to increase an electrostatic discharge path, measured from the aperture to the radiation source, to a desired length.

37. A coupling assembly in a computer input device having a first housing portion, a radiation source, and an image detector, the radiation source emitting radiation toward a movable surface and the image detector receiving radiation reflected off of the surface, the coupling assembly comprising:
   a source housing coupled to the radiation source;
   a first optical coupler, having a longitudinal length and generally defining a substantially linear longitudinal axis, a collection end located proximate the radiation source and an emitting end emitting radiation collected by the collection end to form an illumination pattern on the work surface, the first optical coupler being disposed generally between the source housing and the movable surface; and
   a first optical coupler housing supporting the first optical coupler therein such that its longitudinal axis is at an angle relative to the work surface between 0 and 90 degrees and supporting the first optical coupler to orient the first optical coupler at a predetermined, desired orientation about its longitudinal axis.

38. The coupling assembly of claim 37 wherein the first optical coupler comprises:
   a collection end located proximate the radiation source, collecting radiation emitted by the radiation source.

39. The coupling assembly of claim 38 wherein the first optical coupler comprises:
   an emitting end emitting radiation collected by the collection end to form an illumination pattern on the movable surface.

40. The coupling assembly of claim 39 wherein the first optical coupler comprises:
   a shaping portion shaping the illumination pattern into a desired illumination pattern.

41. The coupling assembly of claim 40 wherein the computer input device includes a rotatable member and wherein the surface comprises a surface of the rotatable member.

42. The coupling assembly of claim 39 wherein the first optical coupler includes an elongate radiation conducting portion between the collection end and the emitting end.

43. The coupling assembly of claim 37 and further comprising:
   a second optical coupler disposed between the surface and the image detector.

44. The coupling assembly of claim 43 wherein the second optical coupler includes:
   an imaging lens located generally between the movable surface and the image detector, the imaging lens focusing radiation reflected from the movable surface on the image detector.

45. The coupling assembly of claim 44 wherein the second optical coupler includes:
   an imaging lens mounting assembly coupled to the imaging lens.

46. The coupling assembly of claim 45 wherein the imaging lens mounting assembly comprises:
   at least one bias member operably coupled to the imaging lens, biasing the imaging lens to a predetermined location relative to the image detector.

47. The coupling assembly of claim 46 wherein the imaging lens mounting assembly includes:
   a lens mounting area and an extending portion extending generally radially outwardly from the lens mounting area.

* * * * *

UNITED STATES PATENT AND TRADEMARK OFFICE
CERTIFICATE OF CORRECTION

PATENT NO. : 6,531,692 B1
DATED : March 11, 2003
INVENTOR(S) : Adan et al.

It is certified that error appears in the above-identified patent and that said Letters Patent is hereby corrected as shown below:

Column 2,
Lines 36 and 37, delete "-"

Column 4,
Lines 27 and 35, delete "."

Column 7,
Line 9, "96-101" should be in bold print

Column 12,
Line 65, "1.07" should be -- 107 --

Column 15,
Line 50, delete "."

Column 16,
Lines 21 and 34, delete "-"

Column 19,
Line 10, delete "-"

Column 20,
Line 19, ";" should be -- , --

Signed and Sealed this

Third Day of August, 2004

JON W. DUDAS
*Acting Director of the United States Patent and Trademark Office*